United States Patent
Mosaki

(10) Patent No.: US 10,787,525 B2
(45) Date of Patent: Sep. 29, 2020

(54) RUBBER CROSSLINKED MATERIAL

(71) Applicant: ZEON CORPORATION, Tokyo (JP)

(72) Inventor: Shiho Mosaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 146 days.

(21) Appl. No.: 15/775,781

(22) PCT Filed: Nov. 16, 2016

(86) PCT No.: PCT/JP2016/083999
§ 371 (c)(1),
(2) Date: May 11, 2018

(87) PCT Pub. No.: WO2017/086358
PCT Pub. Date: May 26, 2017

(65) Prior Publication Data
US 2018/0327517 A1    Nov. 15, 2018

(30) Foreign Application Priority Data

Nov. 20, 2015 (JP) .................................. 2015-227362

(51) Int. Cl.

| | |
|---|---|
| C08K 9/06 | (2006.01) |
| C08C 19/36 | (2006.01) |
| C08K 5/17 | (2006.01) |
| C09K 3/10 | (2006.01) |
| C08L 13/00 | (2006.01) |
| C08K 5/00 | (2006.01) |
| C08K 3/34 | (2006.01) |

(52) U.S. Cl.
CPC ............... *C08C 19/36* (2013.01); *C08K 5/17* (2013.01); *C08K 9/06* (2013.01); *C08L 13/00* (2013.01); *C09K 3/10* (2013.01); *C08K 3/34* (2013.01); *C08K 5/0025* (2013.01)

(58) Field of Classification Search
CPC .. C08C 19/36; C08K 5/17; C08K 9/06; C09K 3/10; C08L 13/00; C08L 15/005
See application file for complete search history.

(56) References Cited

U.S. PATENT DOCUMENTS

| | | | |
|---|---|---|---|
| 2010/0168302 A1* | 7/2010 | Nagamori | ............ C08K 5/005 524/186 |
| 2018/0030190 A1 | 2/2018 | Mosaki et al. | |
| 2018/0251628 A1 | 9/2018 | Sugawara | |
| 2018/0305490 A1 | 10/2018 | Fukumine | |
| 2019/0077938 A1 | 3/2019 | Fukumine | |

FOREIGN PATENT DOCUMENTS

| | | |
|---|---|---|
| EP | 3 269 768 A1 | 1/2018 |
| EP | 3 351 591 A1 | 7/2018 |
| EP | 3 401 361 A1 | 11/2018 |
| EP | 3 431 542 A1 | 1/2019 |
| JP | 2008-163074 A | 7/2008 |
| JP | 2008-179671 A | 8/2008 |

OTHER PUBLICATIONS

May 22, 2018 International Preliminary Report on Patentability issued in International Patent Application No. PCT/JP2016/083999.
May 22, 2019 extended European Search Report issued in European Patent Application No. 16866359.9.
Jan. 17, 2017 International Search Report issued in International Patent Application No. PCT/JP2016/083999.

* cited by examiner

*Primary Examiner* — Peter D. Mulcahy
(74) *Attorney, Agent, or Firm* — Oliff PLC

(57) ABSTRACT

A cross-linked rubber prepared by cross-linking a nitrile rubber composition including: a carboxyl group-containing highly saturated nitrile rubber containing 5 to 60 wt % of an $\alpha,\beta$-ethylenically unsaturated nitrile monomer unit, and an $\alpha,\beta$-ethylenically unsaturated monocarboxylic acid ester monomer unit, and having an iodine value of 120 or less; a surface treated silicate; and a polyamine-based cross-linking agent wherein a content is 0.1 to 20 parts by weight with respect to 100 parts by weight of the carboxyl group-containing highly saturated nitrile rubber, wherein when the rubber is subjected to a compression stress relaxation test wherein it is maintained at 150° C. while being compressed by 25%, the time until which the compression stress comes to be 50% of the initial compression stress at the start of the test, the compression stress after 30 minutes from the start of the test, is 300 hours or more.

10 Claims, No Drawings

RUBBER CROSSLINKED MATERIAL

TECHNICAL FIELD

The present invention relates to a cross-linked rubber good in the tensile strength and the elongation at break, and excellent in the sealing property at a low temperature.

BACKGROUND ART

Nitrile rubbers (acrylonitrile-butadiene copolymer rubbers) have hitherto been used, by taking advantage of the oil resistance, mechanical properties, chemical resistance and the like thereof, as the materials for vehicle rubber components such as hoses and tubes; hydrogenated nitrile rubbers (hydrogenated acrylonitrile-butadiene copolymer rubbers) obtained by hydrogenating the carbon-carbon double bonds in the polymer main chains of nitrile rubbers are more excellent in heat resistance, and accordingly are used as rubber components such as belts, hoses and diaphragms.

As such a nitrile rubber composition, for example, Patent Document 1 has disclosed a cross-linkable nitrile rubber composition comprising a highly saturated nitrile rubber (a) having an α,β-ethylenically unsaturated nitrile monomer unit and an α,β-ethylenically unsaturated dicarboxylic acid monoester monomer unit, and having an iodine value of 120 or less, a silicate (b) of an element of Group 2 or Group 13 of the periodic table, and a polyamine cross-linking agent (c). The object of Patent Document 1 is to provide a cross-linkable nitrile rubber composition giving a cross-linked rubber having an extremely large tensile stress; however, the cross-linked rubber obtained by using the cross-linkable nitrile rubber composition disclosed in Patent Document 1 does not exhibit a sufficient sealing property at low temperature, and accordingly sometimes has not been suitable for being used in the application to seal members used in low temperature environment.

RELATED ART DOCUMENTS

Patent Documents
Patent Document 1: Japanese Patent Laid-Open No. 2008-179671

SUMMARY OF THE INVENTION

Problem to be Solved by the Invention

The present invention was made in view of such a circumstance, and an object of the present invention is to provide a cross-linked rubber good in the tensile strength and the elongation at break, and excellent in the sealing property at a low temperature.

Means for Solving the Problem

The present inventors engaged in a diligent study to achieve the above object, and consequently have perfected the present invention by discovering that the above object can be achieved on the basis of a cross-linked rubber obtained by cross-linking the nitrile rubber composition obtained by including a surface treated silicate and a predetermined amount of a polyamine-based cross-linking agent in a carboxyl group-containing highly saturated nitrile rubber containing 5 to 60 wt % of an α,β-ethylenically unsaturated nitrile monomer unit, and an α,β-ethylenically unsaturated monocarboxylic acid ester monomer unit, and having an iodine value of 120 or less, wherein when the cross-linked rubber is subjected to a compression stress relaxation test in which the cross-linked rubber is maintained at 150° C. in a state of being compressed by 25%, the time until which the compression stress comes to be 50% of the compression stress after 30 minutes from the start of the compression stress relaxation test (hereinafter, referred to as "the initial compression stress at the start of the compression stress relaxation test") is 300 hours or more.

Specifically, the present invention provides a cross-linked rubber prepared by cross-linking a nitrile rubber composition, the nitrile rubber composition comprising: a carboxyl group-containing highly saturated nitrile rubber (a) containing 5 to 60 wt % of an α,β-ethylenically unsaturated nitrile monomer unit, and an α,β-ethylenically unsaturated monocarboxylic acid ester monomer unit, and having an iodine value of 120 or less; a surface treated silicate (b); and a polyamine-based cross-linking agent (c), wherein a content of the polyamine-based cross-linking agent (c) is 0.1 to 20 parts by weight with respect to 100 parts by weight of the carboxyl group-containing highly saturated nitrile rubber (a), wherein
when the cross-linked rubber is subjected to a compression stress relaxation test in which the cross-linked rubber is maintained at 150° C. in a state of being compressed by 25%, the time until which the compression stress comes to be 50% of the initial compression stress at the start of the compression stress relaxation test, the compression stress after 30 minutes from the start of the compression stress relaxation test, is 300 hours or more.

In the cross-linked rubber of the present invention, the surface treated silicate (b) is preferably prepared by surface treating a silicate with an amino group-containing silane coupling agent or an epoxy group-containing silane coupling agent, and is particularly preferably prepared by surface treating a silicate with an amino group-containing silane coupling agent.

In the cross-linked rubber of the present invention, the nitrile rubber composition preferably further contains a basic cross-linking accelerator (d).

In the cross-linked rubber of the present invention, the carboxyl group-containing highly saturated nitrile rubber (a) preferably contains 5 to 60 wt % of an α,β-ethylenically unsaturated nitrile monomer unit, 10 to 55 wt % of an α,β-ethylenically unsaturated monocarboxylic acid ester monomer unit, and 0.1 to 20 wt % of a carboxyl group-containing monomer unit, and the carboxyl group-containing monomer unit is more preferably an α,β-ethylenically unsaturated dicarboxylic acid monoester monomer unit.

In the cross-linked rubber of the present invention, the surface treated silicate (b) is preferably prepared by surface treating, with a surface treating agent, a silicate of an element of Group 2 or Group 13 of the periodic table, and is more preferably prepared by surface treating, with a surface treating agent, a compound represented by the following general formula (1):

$$MO \cdot xSiO_2 \cdot mH_2O \tag{1}$$

(In the general formula (1), M represents an element of Group 2 or Group 13 of the periodic table, x is a positive real number of 8 or less, and m is 0 or a positive real number of 12 or less.)

The present invention also provides a seal member prepared from any one of the above-described cross-linked rubbers.

Effects of Invention

The present invention provides a cross-linked rubber good in the tensile strength and the elongation at break, and excellent in the sealing property at a low temperature.

DESCRIPTION OF EMBODIMENTS

The cross-linked rubber of the present invention is a cross-linked rubber prepared by cross-linking a nitrile rubber composition, the nitrile rubber composition comprising: a carboxyl group-containing highly saturated nitrile rubber (a) containing 5 to 60 wt % of an α,β-ethylenically unsaturated nitrile monomer unit, and an α,β-ethylenically unsaturated monocarboxylic acid ester monomer unit, and having an iodine value of 120 or less; a surface treated silicate (b); and a polyamine-based cross-linking agent (c), wherein a content of the polyamine-based cross-linking agent (c) is 0.1 to 20 parts by weight with respect to 100 parts by weight of the carboxyl group-containing highly saturated nitrile rubber (a), wherein
when the cross-linked rubber is subjected to a compression stress relaxation test in which the cross-linked rubber is maintained at 150° C. in a state of being compressed by 25%, the time until which the compression stress comes to be 50% of the initial compression stress at the start of the compression stress relaxation test, the compression stress after 30 minutes from the start of the compression stress relaxation test, is 300 hours or more.

Nitrile Rubber Composition

First, the nitrile rubber composition used for obtaining the cross-linked rubber of the present invention is described.

The nitrile rubber composition used in the present invention comprises a carboxyl group-containing highly saturated nitrile rubber (a) containing 5 to 60 wt % of an α,β-ethylenically unsaturated nitrile monomer unit, and an α,β-ethylenically unsaturated monocarboxylic acid ester monomer unit, and having an iodine value of 120 or less, a surface treated silicate (b), and a polyamine-based cross-linking agent (c).

Carboxyl Group-Containing Highly Saturated Nitrile Rubber (a)

The carboxyl group-containing highly saturated nitrile rubber (a) used in the present invention is a rubber containing 5 to 60 wt % of an α,β-ethylenically unsaturated nitrile monomer unit, and an α,β-ethylenically unsaturated monocarboxylic acid ester monomer unit, and having an iodine value of 120 or less. The carboxyl group-containing highly saturated nitrile rubber (a) used in the present invention is obtained by copolymerizing an α,β-ethylenically unsaturated nitrile monomer, an α,β-ethylenically unsaturated monocarboxylic acid ester monomer, a carboxyl group-containing monomer, and a copolymerizable other monomer which is added according to need.

The α,β-ethylenically unsaturated nitrile monomer is not particularly limited so long as the α,β-ethylenically unsaturated nitrile monomer is an α,β-ethylenically unsaturated compound having a nitrile group. For example, acrylonitrile; α-halogenoacrylonitriles such as α-chloroacrylonitrile and α-bromoacrylonitrile; α-alkylacrylonitriles such as methacrylonitrile and ethacrylonitrile, etc. may be mentioned. Among these, acrylonitrile and methacrylonitrile are preferable, and acrylonitrile is particularly preferable. As the α,β-ethylenically unsaturated nitrile monomers, a plurality of types of these may be used in combination.

The content of the α,β-ethylenically unsaturated nitrile monomer unit in the carboxyl group-containing highly saturated nitrile rubber (a) used in the present invention is 5 to 60 wt %, preferably 10 to 50 wt %, and more preferably 15 to 50 wt %, in all the monomer units. When the content of the α,β-ethylenically unsaturated nitrile monomer unit is too small, the oil resistance of the obtained cross-linked rubber decreases. On the other hand, when the content of the α,β-ethylenically unsaturated nitrile monomer unit is too large, the cold resistance of the obtained cross-linked rubber decreases.

The α,β-ethylenically unsaturated monocarboxylic acid ester monomer is not particularly limited, but, for example, an α,β-ethylenically unsaturated monocarboxylic acid alkyl ester monomer, an α,β-ethylenically unsaturated monocarboxylic acid alkoxyalkyl ester monomer, an α,β-ethylenically unsaturated monocarboxylic acid aminoalkyl ester monomer, an α,β-ethylenically unsaturated monocarboxylic acid hydroxyalkyl ester monomer, an α,β-ethylenically unsaturated monocarboxylic acid fluoroalkyl ester monomer, etc., may be mentioned.

Among these, the α,β-ethylenically unsaturated monocarboxylic acid alkyl ester monomer or the α,β-ethylenically unsaturated monocarboxylic acid alkoxyalkyl ester monomer is preferable.

By allowing the α,β-ethylenically unsaturated monocarboxylic acid ester monomer unit to be contained, the cold resistance of the obtained cross-linked rubber can be improved, and this enables the improvement of the sealing property at a low temperature.

The α,β-ethylenically unsaturated monocarboxylic acid alkyl ester monomer has, as the alkyl group, an alkyl group having preferably 3 to 10 carbon atoms, more preferably 3 to 8 carbon atoms, and still more preferably 4 to 6 carbon atoms.

As specific examples of the α,β-ethylenically unsaturated monocarboxylic acid alkyl ester monomer, acrylic acid alkyl ester monomers such as propyl acrylate, n-butyl acrylate, n-pentyl acrylate, and 2-ethylhexyl acrylate; acrylic acid cycloalkyl ester monomers such as cyclopentyl acrylate and cyclohexyl acrylate; acrylic acid alkylcycloalkyl ester monomers such as methylcyclopentyl acrylate, ethylcyclopentyl acrylate, and methylcyclohexyl acrylate; methacrylic acid alkyl ester monomers such as propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkylcycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkylcycloalkyl ester monomers such as methylcyclopentyl crotonate, and methylcylcohexyl crotonate, etc. may be mentioned.

The α,β-ethylenically unsaturated monocarboxylic acid alkoxyalkyl ester monomer has, as the alkoxyalkyl group, an alkoxyalkyl group having preferably 2 to 8 carbon atoms, more preferably 2 to 6 carbon atoms, and still more preferably 2 to 4 carbon atoms.

As specific examples of the α,β-ethylenically unsaturated monocarboxylic acid alkoxyalkyl ester monomer, acrylic acid alkoxyalkyl ester monomers such as methoxymethyl acrylate, methoxyethyl acrylate, ethoxymethyl acrylate, ethoxyethyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, ethoxymethyl methacrylate, ethoxyethyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, and methoxybutyl methacrylate; etc. may be mentioned.

Among these $\alpha,\beta$-ethylenically unsaturated monocarboxylic acid ester monomers, from the viewpoint of being capable of making the effects of the present invention more remarkable, acrylic acid alkyl ester monomers and acrylic acid alkoxyalkyl ester monomers are preferable, and n-butyl acrylate and methoxyethyl acrylate are more preferable.

The content of the $\alpha,\beta$-ethylenically unsaturated monocarboxylic acid ester monomer unit in the carboxyl group-containing highly saturated nitrile rubber (a) used in the present invention is preferably 5 to 60 wt %, more preferably 10 to 55 wt %, and still more preferably 15 to 50 wt %. By setting the content of the $\alpha,\beta$-ethylenically unsaturated monocarboxylic acid ester monomer unit within the above-mentioned range, it is possible to more enhance an effect of improving the sealing property at a low temperature.

The carboxyl group-containing monomer is not particularly limited so long as the carboxyl group-containing monomer is copolymerizable with the $\alpha,\beta$-ethylenically unsaturated nitrile monomer and the $\alpha,\beta$-ethylenically unsaturated monocarboxylic acid ester monomer, and is a monomer having one or more unsubstituted (free) carboxyl group which is not esterified etc. By allowing the carboxyl group-containing monomer to be copolymerized, it is possible to introduce carboxyl groups into the nitrile rubber.

As the carboxyl group-containing monomer used in the present invention, an $\alpha,\beta$-ethylenically unsaturated monocarboxylic acid monomer, an $\alpha,\beta$-ethylenically unsaturated polyvalent carboxylic acid monomer, an $\alpha,\beta$-ethylenically unsaturated dicarboxylic acid monoester monomer, etc. may be mentioned. The carboxyl group-containing monomers also include the monomers in which the carboxyl groups of these monomers form carboxylic acid salts. Moreover, the anhydride(s) of the $\alpha,\beta$-ethylenically unsaturated polyvalent carboxylic acid forms a carboxyl group(s) by cleaving the acid anhydride group(s) after copolymerization, and hence can be used as a carboxyl group-containing monomer.

As the $\alpha,\beta$-ethylenically unsaturated monocarboxylic acid monomer, acrylic acid, methacrylic acid, ethylacrylic acid, crotonic acid, cinnamic acid, etc. may be mentioned.

As the $\alpha,\beta$-ethylenically unsaturated polyvalent carboxylic acid monomer, butenedioic acids such as fumaric acid and maleic acid; and itaconic acid, citraconic acid, mesaconic acid, glutaconic acid, allylmalonic acid, teraconic acid, etc. may be mentioned. As the anhydride of the $\alpha,\beta$-unsaturated polyvalent carboxylic acid, maleic anhydride, itaconic anhydride, citraconic anhydride, etc. may be mentioned.

As the $\alpha,\beta$-ethylenically unsaturated dicarboxylic acid monoester monomer, maleic acid monoalkyl ester such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; etc. may be mentioned.

The carboxyl group-containing monomers may be used as single types alone or as a plurality of types combined. Among the carboxyl group-containing monomers, from the viewpoint of being able to make the effect of the present invention much more remarkable, the $\alpha,\beta$-ethylenically unsaturated dicarboxylic acid monoester monomer is preferable, the $\alpha,\beta$-ethylenically unsaturated dicarboxylic acid monoalkyl ester monomer is more preferable, the maleic acid monoalkyl ester is further preferable, and mono-n-butyl maleate is particularly preferable. Note that the number of carbon atoms of the alkyl group of the alkyl ester is preferably 2 to 8.

The content of the carboxyl group-containing monomer unit is preferably 0.1 to 20 wt %, more preferably 0.2 to 15 wt %, and still more preferably 0.5 to 10 wt %, in all the monomer units. By setting the content of the carboxyl group-containing monomer unit within the above-mentioned range, it is possible to more improve the mechanical properties and sealing property at a low temperature of the obtained cross-linked rubber.

In addition, the carboxyl group-containing highly saturated nitrile rubber (a) used in the present invention preferably contains a conjugated diene monomer as copolymerized therein so that the obtained cross-linked rubber has rubber elasticity.

As the conjugated diene monomer, conjugated diene monomer having 4 to 6 carbon atoms such as 1,3-butadiene, isoprene, 2,3-dimethyl-1,3-butadiene, 1,3-pentadiene, and chloroprene is preferable, 1,3-butadiene and isoprene are more preferable, and 1,3-butadiene is particularly preferable. The conjugated diene monomers may be used as single types alone or as a plurality of types combined.

The content (the hydrogenated fraction is also included) of the conjugated diene monomer unit in the carboxyl group-containing highly saturated nitrile rubber (a) used in the present invention is preferably 20 to 83.9 wt %, more preferably 25 to 81 wt %, and still more preferably 30 to 74.5 wt %. By setting the content of the conjugated diene monomer unit within the above-mentioned range, it is possible to make the obtained cross-linked rubber excellent in the rubber elasticity while maintaining a good heat resistance and chemical stability.

The carboxyl group-containing highly saturated nitrile rubber (a) used in the present invention may also include, in addition to the $\alpha,\beta$-ethylenically unsaturated nitrile monomer unit, the $\alpha,\beta$-ethylenically unsaturated monocarboxylic acid ester monomer unit, the carboxyl group-containing monomer unit, and the conjugated diene monomer unit, other monomer units copolymerizable with the monomers forming these. As such other monomers, for example, an α,β-ethylenically unsaturated dicarboxylic acid diester monomer, a nonconjugated diene monomer, an α-olefin monomer, an aromatic vinyl monomer, a fluorine-containing vinyl monomer, and a copolymerizable antiaging agent, etc. may be mentioned.

As the α,β-ethylenically unsaturated dicarboxylic acid diester monomer, dialkyl maleates containing alkyl groups having 1 to 18 carbon atoms such as dimethyl maleate and di-n-butyl maleate; dialkyl fumarates containing alkyl groups having 1 to 18 carbon atoms such as dimethyl fumarate and di-n-butyl fumarate; dicycloalkyl maleates containing cycloalkyl groups having 4 to 16 carbon atoms such as dicyclopentyl maleate and di cyclohexyl maleate; dicycloalkyl fumarates containing cycloalkyl groups having 4 to 16 carbon atoms such as dicyclopentyl fumarate and dicyclohexyl fumarate; dialkyl itaconates containing alkyl groups having 1 to 18 carbon atoms such as dimethyl itaconate and di-n-butyl itaconate; dicycloalkyl itaconates containing cycloalkyl groups having 4 to 16 carbon atoms such as dicyclohexyl itaconate; etc. may be mentioned.

As the nonconjugated diene monomer, 1,4-pentadiene and 1,4-hexadiene, etc. may be mentioned.

As the α-olefin monomer, ethylene, propylene, 1-butene, 4-methyl-1-pentene, 1-hexene, and 1-octene, etc. may be mentioned.

As the aromatic vinyl monomer, styrene, α-methylstyrene, vinylpyridine, etc. may be mentioned.

As the fluorine-containing vinyl monomer, fluoroethyl vinyl ether, fluoropropyl vinyl ether, o-trifluorcmethylstyrene, vinyl pentafluorobenzoate, difluoroethylene, tetrafluoroethylene, etc. may be mentioned.

As the copolymerizable antiaging agent, N-(4-anilinophenyl) acrylamide, N-(4-anilinophenyl) methacrylamide, N-(4-anilinophenyl) cinnamamide, N-(4-anilinophenyl) crotonamide, N-phenyl-4-(3-vinylbenzyloxy) aniline, N-phenyl-4-(4-vinylbenzyloxy) aniline, etc. may be mentioned.

These copolymerizable other monomers may be used as a plurality of types combined. The content of the copolymerizable other monomer unit(s) is preferably 50 wt % or less, more preferably 30 wt % or less, and still more preferably 10 wt % or less, in all the monomer units forming the carboxyl group-containing highly saturated nitrile rubber (a) used in the present invention.

The iodine value in the carboxyl group-containing highly saturated nitrile rubber (a) used in the present invention is 120 or less, preferably 60 or less, more preferably 40 or less, and particularly preferably 30 or less. When the iodine value of the carboxyl group-containing highly saturated nitrile rubber (a) is too high, the heat resistance and the ozone resistance of the obtained cross-linked rubber are liable to be degraded.

The polymer Mooney viscosity ($ML_{1+4}$, 100° C.) of the carboxyl group-containing highly saturated nitrile rubber (a) used in the present invention is preferably 10 to 200, more preferably 15 to 150, still more preferably 15 to 100, and particularly preferably 30 to 70. When the polymer Mooney viscosity of the carboxyl group-containing highly saturated nitrile rubber (a) is too low, the mechanical properties of the obtained cross-linked rubber are liable to be degraded; on the contrary when the foregoing polymer Mooney viscosity is too high, the processability of the nitrile rubber composition is possibly degraded.

The method for producing the carboxyl group-containing highly saturated nitrile rubber (a) used in the present invention is not particularly limited, but it is possible to produce it by copolymerizing the above-mentioned monomers and, if necessary, hydrogenating the carbon-carbon double bonds in the obtained copolymer. The polymerization method is not particularly limited and a known emulsion polymerization method or solution polymerization method may be used, but the emulsion polymerization method is preferable from the viewpoint of the industrial productivity. At the time of the emulsion polymerization, in addition to the emulsifier, a polymerization initiator, and a molecular weight adjuster, polymerization auxiliary materials usually used can be used.

The emulsifier is not particularly limited, but, for example, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzene sulfonate, higher alcohol sulfuric acid ester salts, and alkyl sulfosuccinic acid salts; and copolymerizable emulsifiers such as sulfo esters of α,β-unsaturated carboxylic acids, sulfate esters of α,β-unsaturated carboxylic acids, sulfoalkylaryl ethers, etc. may be mentioned. The amount of addition of the emulsifier is preferably 0.1 to 10 parts by weight and more preferably 0.5 to 5 parts by weight with respect to 100 parts by weight of the monomer used for the polymerization.

The polymerization initiator is not particularly limited so long as the polymerization initiator is a radical initiator. For example, inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobis-cyclohexanecarbonitrile, and methyl azobisisobutyrate; etc. may be mentioned. These polymerization initiators can be used alone or as two or more types combined. As the polymerization initiator, an inorganic or organic peroxide is preferable. When a peroxide is used as a polymerization initiator, the peroxide can be used in combination with a reducing agent such as sodium bisulfite or ferrous sulfate as a redox-type polymerization initiator. The amount of addition of the polymerization initiator is preferably 0.01 to 2 parts by weight, with respect to 100 parts by weight of the monomers used for the polymerization.

The molecular weight adjuster is not particularly limited, but from the viewpoint of being able to make the action and effect of the present invention more remarkable, it is preferable in combination an alkylthiol compound having 12 to 16 carbon atoms (hereinafter, appropriately referred to as "the first alkylthiol compound") having at least three tertiary or higher carbon atoms and a thiol group directly bonded to at least one carbon atom of these carbon atoms, and an alkylthiol compound having 9 to 16 carbon atoms other than "the first alkylthiol compound" (specifically, an alkylthiol compound having 9 to 16 carbon atoms with the number of the tertiary or higher carbon atoms being less than three, or an alkyl thiol compound having 9 to 16 carbon atoms with the number of the tertiary or higher carbon atoms being three or more and without having any thiol group directly bonded to a tertiary carbon atom; hereinafter appropriately referred to as "the second alkylthiol compound"). In this case, the amount of use of the first alkylthiol compound is set to be 0.01 to 0.6 part by weight, and preferably 0.02 to 0.4 part by weight, and the amount of use of the second alkylthiol compound is set to be 0.01 to 0.8 part by weight and preferably 0.1 to 0.7 part by weight, with respect to 100 parts by weight of the monomers to be used for the emulsion polymerization.

For the medium of emulsion polymerization, usually water is used. The amount of the water is preferably 80 to 500 parts by weight, and more preferably 80 to 300 parts by weight, with respect to 100 parts by weight of the monomers used for the polymerization.

In the emulsion polymerization, it is possible to further use, if necessary, polymerization auxiliary materials such as a stabilizer, a dispersant, a pH adjuster, a deoxidizer, and a particle size adjuster. When these are used, the types and the amounts used thereof are not particularly limited.

When the emulsion polymerization is performed, the polymerization reaction may be started by using the total amount of the monomers to be used for the emulsion polymerization, or alternatively, the polymerization reaction may be started by using a fraction of the total amount of the monomers to be used in the emulsion polymerization, and subsequently, the rest of the monomers to be used in the emulsion polymerization may be added in the reactor in a stage midway through the reaction, and thus the polymerization reaction may be performed. The method for adding the rest of the monomers is not particularly limited; the rest of the monomers may be added in a lump, dividedly or continuously. When the rest of the monomers is added dividedly, the amounts of the dividedly added monomers and the periods of time of the divided additions may be appropriately regulated in accordance with the progress of the polymerization reaction; the manner of the divided addition may be set so as for the desired carboxyl group-containing highly saturated nitrile rubber (a) to be obtained herewith.

Further, in the present invention, for the obtained copolymer, if necessary, the copolymer may be hydrogenated (hydrogenation reaction). The hydrogenation may be performed on the basis of a known method. An oil layer hydrogenation method in which the latex of the copolymer obtained by emulsion polymerization is coagulated, and then the hydrogenation is performed in the oil layer; and an aqueous layer hydrogenation method in which the latex of the obtained copolymer is hydrogenated as it is, etc. may be mentioned.

When the hydrogenation is performed by the oil layer hydrogenation method, preferably the latex of the copolymer prepared by the emulsion polymerization is coagulated by salting out or by using an alcohol, and the coagulated product is filtered out and dried, and then, dissolved in an organic solvent. Next, a hydrogenation reaction (the oil layer hydrogenation method) is performed, the obtained hydride is poured into a large amount of water to be coagulated, the coagulated product is filtered out and dried, and thus the carboxyl group-containing nitrile rubber (a) can be obtained.

For the coagulation of the latex by salting out, a known coagulant such as sodium chloride, calcium chloride, or aluminum sulfate can be used. Further, instead of the coagulation by salting out, the coagulation may also be performed by using an alcohol such as methanol. The solvent for the oil layer hydrogenation method is not particularly limited so long as the solvent is a liquid organic compound dissolving the copolymer obtained by emulsion polymerization; however, as such a solvent, preferably used are benzene, chlorobenzene, toluene, xylene, hexane, cyclohexane, tetrahydrofuran, methyl ethyl ketone, ethyl acetate, cyclohexanone and acetone.

As the catalyst of the oil layer hydrogenation method, any known selective hydrogenation catalyst can be used without particular limitation; a palladium-based catalyst and a rhodium-based catalyst are preferable, and a palladium-based catalyst (such as palladium acetate, palladium chloride and palladium hydroxide) are more preferable. These may be used as two or more types combined; however, in such a case, it is preferable to use a palladium-based catalyst as the main active component. These catalysts are usually used as carried on carriers. As the carrier, silica, silica-alumina, alumina, diatomaceous earth, activated carbon, etc. may be mentioned. The amount of use of the catalyst is preferably 10 to 5000 ppm by weight and more preferably 100 to 3000 ppm by weight with respect to the copolymer.

Alternatively, when the hydrogenation is performed by the aqueous layer hydrogenation method, the hydrogenation reaction is performed by adding water to and diluting, if necessary, the latex of the copolymer prepared by the emulsion polymerization. The aqueous layer hydrogenation method includes an aqueous layer direct hydrogenation method in which the latex is hydrogenated by supplying hydrogen to the reaction system in the presence of a hydrogenation catalyst, and an indirect aqueous layer hydrogenation method in which the latex is hydrogenated by reducing the latex in the presence of an oxidizing agent, a reducing agent and an activating agent. Of these two methods, the aqueous layer direct hydrogenation method is preferable.

In the aqueous layer direct hydrogenation method, the concentration of the copolymer in the aqueous layer (concentration in latex state) is preferably 40 wt % or less, in order to prevent the aggregation. The hydrogenation catalyst is not particularly limited so long as the catalyst is a compound being hardly decomposed by water. As specific examples, among palladium catalysts, as palladium salts of carboxylic acids such as formic acid, propionic acid, lauric acid, succinic acid, oleic acid, and phthalic acid; palladium chlorides such as palladium chloride, dichloro(cyclooctadiene) palladium, dichloro(norbornadiene) palladium, and ammonium hexachloropalladate (IV); iodides such as palladium iodide; palladium sulfate.dihydrate, etc. may be mentioned. Among these, the palladium salts of carboxylic acids, dichloro (norbornadiene) palladium, and ammonium hexachloropalladate (IV) are particularly preferable. The amount of use of the hydrogenation catalyst may be appropriately set; however, the amount of use of the hydrogenation catalyst is preferably 5 to 6000 ppm by weight and more preferably 10 to 4000 ppm by weight with respect to the copolymer obtained by polymerization.

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon or an ion-exchange resin is added to the latex, the hydrogenation catalyst is adsorbed to the adsorbent under stirring, and then the latex is subjected to a filtration or centrifugation. It is also possible not to remove the hydrogenation catalyst so as remain in the latex.

Further, in the aqueous layer direct hydrogenation method, the thus obtained latex after the hydrogenation reaction is salted out to be coagulated, filtered and dried, and subjected to other operations, and thus, the carboxyl group-containing nitrile rubber (a) can be obtained. In this case, the steps of filtration and drying following the step of coagulation can be performed with known methods, respectively.

Surface Treated Silicate (b)

The surface treated silicate (b) used in the present invention is a silicate subjected to a surface treatment, can be any surface treated silicate without being particularly limited.

The silicate is not particularly limited, but is preferably a silicate of an element of Group 2 or Group 13 of the periodic table, and more preferably a compound represented by the following general formula (1):

$$MO \cdot xSiO_2 \cdot mH_2O \qquad (1)$$

(In the general formula (1), M represents an element of Group 2 or Group 13 of the periodic table, x is a positive real number of 8 or less, and m is 0 or a positive real number of 12 or less.)

In the general formula (1), as the M-constituting element of Group 2 of the periodic table, magnesium, calcium, strontium, barium, etc. may be mentioned, and among these, magnesium is preferable. In addition, in the general formula (1), as the M-constituting element of Group 13 of the periodic table, boron, aluminum, etc. may be mentioned, and among these, aluminum is preferable.

As the specific examples of the compound represented by the general formula (1), magnesium silicate, magnesium silicate hydrate, calcium silicate, calcium silicate hydrate, boron silicate, boron silicate hydrate, aluminum silicate, aluminum silicate hydrate, etc. may be mentioned, and among these, magnesium silicate and aluminum silicate are more preferable, and aluminum silicate is particularly preferable.

In the surface treated silicate (b) used in the present invention, the surface treating agent used for treating the surface of the above-mentioned silicates is not particularly limited, but silane coupling agents are suitably used.

As specific examples of the silane coupling agent, sulfur-containing silane coupling agents such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl)disulfane; epoxy group-containing silane coupling agents such as γ-glycidoxypropyltrimethoxysilane, γ-glycidoxypropylmethyldimethoxysilane, β-(3,4-epoxycyclohexyl)ethyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane; (meth)acryloxy group-containing silane coupling agents such as γ-methacryloxypropyltrimethoxysilane, γ-methacryloxypropyltris(β-methoxyethoxy) silane, γ-methacryloxypropylmethyldimethoxysilane, γ-methacryloxypropylmethyldiethoxysilane, γ-methacryloxypropyltriethoxysilane, and 3-acryloxypropyltrimethoxysilane; vinyl group-containing silane coupling agents such as vinyltrimethoxysilane, vinyltriethoxysilane, vinyltris(β-methoxyethoxy) silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatopropyltriethoxysilane; styryl group-containing silane coupling agents such as p-styryltrimethoxysilane; ureido group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; alkyl group-containing silane coupling agents such as isobutyltrimethoxysilane and cyclohexylmethyldimethoxysilane; aluminum-based coupling agents such as acetoalkoxyaluminum diisopropylate; titanate-based coupling agents such as isopropyltriisostearoyl titanate, isopropyltris(dioctylpyrophosphate) titanate, isopropyltri(N-aminoethyl-aminoethyl) titanate, tetraoctylbis(ditridecylphosphite) titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate, tetraisopropylbis(dioctylphosphite) titanate, and isopropyltriisostearoyl titanate; etc. may be mentioned. These may be used as single types or a plurality of types combined.

Among these, from the viewpoint of being able to make the action and effect of the present invention more remarkable, the amino group-containing silane coupling agents or the epoxy group-containing silane coupling agents are preferable, and the amino group-containing silane coupling agents are particularly preferable. In other words, the surface treated silicate (b) is prepared preferably by surface treating a silicate with an amino group-containing silane coupling agent or an epoxy group-containing silane coupling agent, and particularly preferably by surface treating a silicate with an amino group-containing silane coupling agent.

The average particle size of the surface treated silicate (b) is not particularly limited, but is preferably 0.01 to 100 μm, and more preferably 0.05 to 50 μm.

The content of the surface treated silicate (b) in the nitrile rubber composition of the present invention is preferably 5 to 150 parts by weight, more preferably 10 to 120 parts by weight, and still more preferably 20 to 100 parts by weight, with respect to 100 parts by weight of the carboxyl group-containing highly saturated nitrile rubber (a). By setting the content of the surface treated silicate (b) within the above-mentioned range, it is possible to more appropriately improve the sealing property of the obtained cross-linked rubber at a low temperature while the processability of the nitrile rubber composition is being made good.

Polyamine-Based Cross-Linking Agent (c)

The nitrile rubber composition used in the present invention comprises the polyamine-based cross-linking agent (c) in addition to the above-mentioned carboxyl group-containing highly saturated nitrile rubber (a) and surface treated silicate (b). By using the above-mentioned carboxyl group-containing highly saturated nitrile rubber (a) and surface treated silicate (b) in combination with the polyamine-based cross-linking agent (c), it is possible to make the obtained cross-linked rubber excellent in the sealing property at a low temperature.

The polyamine-based cross-linking agent (c) is not particularly limited so long as the polyamine-based cross-linking agent is a compound having two or more amino groups or a compound becoming a form having two or two or more amino groups at the time of cross-linking; however, the polyamine-based cross-linking agent is preferably a compound derived from an aliphatic hydrocarbon or an aromatic hydrocarbon by substituting a plurality of the hydrogen atoms with amino groups or hydrazide structures (structures each represented by —CONHNH$_2$, where CO represents a carbonyl group) and a compound becoming the form of the aforementioned compound at the time of cross-linking.

As specific examples of the polyamine-based cross-linking agent (c), aliphatic polyvalent amines such as hexamethylenediamine, hexamethylenediamine carbamate, N, N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy) biphenyl, m-xylylenediamine, p-xylylenediamine, and 1,3,5-benzenetriamine; and polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; etc. may be mentioned. Among these, from the viewpoint of being capable of making the effects of the present invention more remarkable, aliphatic polyvalent amines and the aromatic polyvalent amines are preferable, hexamethylenediamine carbamate and 2,2-bis[4-(4-aminophenoxy)phenyl]propane are more preferable, and hexamethylenediamine carbamate is particularly preferable.

The content of the polyamine-based cross-linking agent (c) in the nitrile rubber composition used in the present invention is 0.1 to 20 parts by weight, and preferably 0.2 to 15 parts by weight, with respect to 100 parts by weight of the carboxyl group-containing highly saturated nitrile rubber (a). When the content of the polyamine-based cross-linking agent (c) is too small or too large, the obtained cross-linked rubber is degraded in the mechanical properties and the sealing property at a low temperature.

Basic Cross-Linking Accelerator (d)

In addition, the nitrile rubber composition used in the present invention preferably further contains the basic cross-linking accelerator (d) in addition to the above-mentioned carboxyl group-containing highly saturated nitrile rubber (a), surface treated silicate (b) and polyamine-based cross-linking agent (c), from the viewpoint of being able to make the action and effect of the present invention more remarkable.

As specific examples of the basic cross-linking accelerator, a compound represented by the following general formula (2), a basic cross-linking accelerator having a cyclic amidine structure, a guanidine-based basic cross-linking accelerator, an aldehyde amine-based basic cross-linking accelerator, etc. may be mentioned.

$$R^1\text{—}NH\text{—}R^2 \quad (2)$$

(In the general formula (2), $R^1$ and $R^2$ are each independently a substituted or unsubstituted alkyl group having 1 to 12 carbon atoms, or a substituted or unsubstituted cycloalkyl group having 5 to 12 carbon atoms.)

$R^1$ and $R^2$ are each a substituted or unsubstituted alkyl group having 1 to 12 carbon atoms, or a substituted or unsubstituted cycloalkyl group having 5 to 12 carbon atoms, but are each preferably a substituted or unsubstituted cycloalkyl group having 5 to 12 carbon atoms, and particularly preferably a substituted or unsubstituted cycloalkyl group having 5 to 8 carbon atoms.

Further, $R^1$ and $R^2$ each preferably have no substituent.

Note that, as specific examples of the substituent(s) in the case where $R^1$ and $R^2$ each have a substituent (s), a hydroxyl group, an alkoxy group, an alkoxycarbonyl group, an amino group, a halogen atom, etc. may be mentioned.

Further, among the compounds represented by the above general formula (2), from the viewpoint of being capable of more enhancing the processability and scorch stability, a compound represented by the following general formula (3) is more preferable.

$$R^3\text{—}NH\text{—}R^4 \quad (3)$$

(In the general formula (3), $R^3$ and $R^4$ are each independently a substituted or unsubstituted cycloalkyl group having 5 to 8 carbon atoms.)

$R^3$ and $R^4$ are each a substituted or unsubstituted cycloalkyl group having 5 to 8 carbon atoms, but are each preferably a substituted or unsubstituted cycloalkyl group having 5 to 6 carbon atoms, and more preferably a substituted or unsubstituted cycloalkyl group having 6 carbon atoms.

Further, $R^3$ and $R^4$ each preferably have no substituent.

Note that as specific examples of the substituent(s) in the case where $R^3$ and $R^4$ each have a substituent (s), a hydroxyl group, an alkoxy group, an alkoxycarbonyl group, an amino group, a halogen atom, etc. may be mentioned.

As specific examples of the compound represented by the general formula (2), dicycloalkylamines such as dicyclopentylamine, dicyclohexylamine, and dicycloheptylamine; secondary amines each having an alkyl group and a cycloalkyl group bonded to the nitrogen atom such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; secondary amines each having a hydroxyl group-containing alkyl group and a cycloalkyl group bonded to the nitrogen atom such as N-hydroxymethylcyclopentylamine and N-hydroxybutylcyclohexylamine; secondary amines each having an alkoxy group-containing alkyl group and a cycloalkyl group bonded to the nitrogen atom such as N-methoxyethylcyclopentylamine and N-ethoxybutylcyclohexylamine; secondary amines each having an alkoxycarbonyl group-containing alkyl group and a cycloalkyl group bonded to the nitrogen atom such as N-methoxycarbonylbutylcyclopentylamine and N-methoxycarbonylheptylcyclohexylamine; secondary amines each having an amino group-containing alkyl group and a cycloalkyl group bonded to the nitrogen atom such as N-aminopropylcyclopentylamine and N-aminoheptylcyclohexylamine; and secondary amines each having a halogen atom-containing cycloalkyl group bonded to the nitrogen atom such as di(2-chlorocyclopentyl)amine and di(3-chlorocyclopentyl)amine; etc. may be mentioned, but from the viewpoint of being capable of more enhancing the processability and the scorch stability, a dicycloalkylamine is preferable, dicyclopentylamine and dicyclohexylamine are more preferable, and dicyclohexylamine is particularly preferable.

As the basic cross-linking accelerator having a cyclic amidine structure, 1,8-diazabicyclo[5.4.0]undecene-7 (hereinafter, sometimes abbreviated as "DBU"), 1,5-diazabicyclo[4.3.0]nonene-5 (hereinafter, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, etc. may be mentioned. Among these basic cross-linking accelerators each having a cyclic amidine structure, 1,8-diazabicyclo[5.4.0]undecene-7 and 1,5-diazabicyclo[4.3.0]nonene-5 are preferable, and 1,8-diazabicyclo[5.4.0]undecene-7 is more preferable.

As the guanidine-based basic cross-linking accelerator, tetramethylguanidine, tetraethylguanidine, diphenylguanidine, 1,3-di-o-tolylguanidine, o-tolylbiguanide, etc. may be mentioned.

As the aldehyde amine-based basic cross-linking accelerator, n-butylaldehyde aniline, acetaldehyde ammonia, etc. may be mentioned.

Among these basic cross-linking accelerators, a compound represented by the general formula (2), a guanidine-based basic cross-linking accelerator, and a basic cross-linking accelerator having a cyclic amidine structure are preferable, and a compound represented by the general formula (2) and a basic cross-linking accelerator having a cyclic amidine structure are more preferable.

Note that the compound represented by the general formula (2) may be comprised of alcohols such as an alkylene glycol and an alkyl alcohol having 5 to 20 carbon atoms mixed together, and may further contain an inorganic acid and/or an organic acid. Further, as for the compound represented by the general formula (2), the compound represented by the general formula (2) may form a salt (s) with the inorganic acid and/or the organic acid, and further may form a complex with an alkylene glycol. Further, the basic cross-linking accelerator having the above cyclic amidine structure may form a salt with a carboxylic acid or an alkyl phosphoric acid, etc.

In the case where the basic cross-linking accelerator (d) is mixed, the amount of the basic cross-linking accelerator in the nitrile rubber composition used in the present invention is preferably 0.1 to 20 parts by weight, more preferably 0.2 to 15 parts by weight, and still more preferably 0.5 to 10 parts by weight, with respect to 100 parts by weight of the carboxyl group-containing highly saturated nitrile rubber (a).

Further, the nitrile rubber composition used in the present invention may include, in addition to the above components, compounding agents usually used in the field of rubber such as a filler other than the surface treated silicate (b), a co-cross-linking agent, a cross-linking aid, a cross-linking retarder, an antiaging agent, an antioxidant, a light stabilizer, a scorch retarder such as a primary amine, an activating agent such as diethylene glycol, a plasticizer, a processing aid, a slip agent, an adhesive, a lubricant, a flame retardant, an antifungal agent, an acid acceptor, an antistatic agent, a pigment, and a foaming agent. The amounts of these compounding agents are not particularly limited and the compounding agents can be compounded in the amounts according to the compounding purposes so long as the compounding amounts are within ranges not impairing the object and the effects of the present invention.

The filler other than the surface treated silicate (b) is not particularly limited, but as examples thereof, carbon black, silica, calcium carbonate, magnesium oxide, staple fiber, and $\alpha,\beta$-ethylenically unsaturated carboxylic acid metal salts such as zinc (meth)acrylate and magnesium (meth)acrylate may be mentioned.

The co-cross-linking agent is not particularly limited, but is preferably a low molecular weight or high molecular weight compound having a plurality of radically reactive unsaturated groups in the molecule. For example, polyfunctional vinyl compounds such as divinylbenzene and divinylnaphthalene; isocyanurates such as triallyl isocyanurate and trimethallyl isocyanurate; cyanurates such as triallylcyanurate; maleimides such as N,N'-m-phenylenedimaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylol propane, and partial allyl ether of pentaerythrit; allyl-modified resins such as allylated novolac resin and allylated resol resin; and 3 to 5-functional methacrylate compounds and acrylate compounds such as trimethylolpropane trimethacrylate and trimethylolpropane triacrylate; etc. may be mentioned. These may be used as single types or a plurality of types combined.

The plasticizer is not particularly limited, but possible to use a trimellitic acid-based plasticizer, a pyromellitic acid-based plasticizer, an ether ester-based plasticizer, a polyester-based plasticizer, a phthalic acid-based plasticizer, an adipic acid ester-based plasticizer, a phosphoric acid ester-based plasticizer, a sebacic acid ester-based plasticizer, an alkylsulfonic acid ester compound plasticizer, and an epoxidized vegetable oil-based plasticizer can be used. As specific examples, tri-2-ethylhexyl trimellitate, trimellitic acid isonenyl ester, trimellitic acid mixed linear alkyl ester, dipentaerythritol ester, pyromellitic acid 2-ethylhexyl ester, polyether ester (molecular weight: approximately 300 to 5000), adipic acid bis[2-(2-butoxyethoxy)ethyl], dioctyl adipate, adipic acid-based polyester (molecular weight: approximately 300 to 5000), dioctyl phthalate, diisononyl phthalate, dibutyl phthalate, tricresyl phosphate, dibutyl sebacate, alkylsulfonic acid phenyl ester, epoxidized soybean oil, diheptanoate, di-2-ethyl hexanoate, didecanoate, etc. may be mentioned. These may be used as single types or a plurality of types combined.

Furthermore, the nitrile rubber composition used in the present invention may contain rubber other than the above-mentioned carboxyl group-containing highly saturated nitrile rubber (a) in a range where the effects of the present invention are not obstructed. As such rubber other than the above-mentioned carboxyl group-containing highly saturated nitrile rubber (a), acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, polyisoprene rubber, etc. may be mentioned. When mixing in rubber other than the carboxyl group-containing highly saturated nitrile rubber (a), the amount is preferably 30 parts by weight or less, more preferably 20 parts by weight or less, still more preferably 10 parts by weight or less with respect to 100 parts by weight of the carboxyl group-containing highly saturated nitrile rubber (a).

The nitrile rubber composition used in the present invention is prepared by mixing the above-mentioned ingredients preferably in a nonaqueous system. The method for preparing the nitrile rubber composition used in the present invention is not limited, but the nitrile rubber composition used in the present invention can be usually prepared as follows: the ingredients other than the polyamine-based cross-linking agent (c) and the ingredients unstable against heat (such as a cross-linking aid) are subjected to a primary kneading with a mixing machine such as a Banbury mixer, an internal mixer and a kneader; then the kneaded mixture is transferred to a roll or the like, and the polyamine-based cross-linking agent (c) and the ingredients unstable against heat are added to the kneaded mixture, and then the resulting mixture is subjected to a secondary kneading to prepare the nitrile rubber composition used in the present invention.

Cross-Linked Rubber

The cross-linked rubber of the present invention is a cross-linked rubber obtained by cross-linking the above-mentioned nitrile rubber composition.

In the cross-linked rubber of the present invention, when the cross-linked rubber is subjected to a compression stress relaxation test in which the cross-linked rubber is maintained at 150° C. in a state of being compressed by 25%, the time until which the compression stress comes to be 50% of the initial compression stress (namely, the compression stress after 30 minutes from the start of the compression stress relaxation test) is 300 hours or more, preferably 400 hours or more, and more preferably 500 hours or more. In the present invention, by using the above-mentioned nitrile rubber composition, and at the same time by setting the time until which the compression stress comes to be 50% of the initial compression stress in the compression stress relaxation test so as to be 300 hours or more, it is possible to make the cross-linked rubber excellent in the sealing property at a low temperature while the tensile strength and the elongation at break are being allowed to be good. Specifically, TR70, namely, the temperature (the temperature exhibiting a low temperature elastic recovery rate of 70%) at which 70% shrinkage (recovery) occurs due to temperature increase can be made to be preferably −19° C. or lower, and more preferably −20° C. or lower.

Note that as the example of the compression stress relaxation test, the following method may be mentioned: a method in which a cross-linked rubber is molded into an O-ring shape having an inner diameter of 30 mm and a ring diameter of 3 mm, the cross-linked rubber in the O-ring shape is made to be in a state of being compressed by 25% in the ring thickness direction in terms of the distance between the two planes sandwiching the O-ring, the O-ring is maintained in an environment at 150° C., and the compression stress is measured.

The cross-linked rubber of the present invention can be produced as follows: the above nitrile rubber composition is used, the composition is formed by using a forming machine corresponding to the desired shape, such as an extruder, an injection molding machine, a compressor, or a roll, the cross-linking reaction is performed by heating the formed product, and thus the shape of the formed product is fixed to produce the cross-linked rubber. In this case, the cross-linking may be performed after preliminarily performing the forming, or alternatively, the forming and the cross-linking may also be performed simultaneously. As the heating method, a general method which is used for cross-linking rubber such as press heating, steam heating, oven heating, and hot air heating may be suitably selected.

Note that in the present invention, the method allowing the cross-linked rubber to have a time of 300 hours or more as the time until which the compression stress comes to be 50% of the initial compression stress in the compression stress relaxation test is not particularly limited, but as such a method, for example, the following may be mentioned: a method in which the type and the content of the polyamine-based cross-linking agent (c) to be contained in the nitrile rubber composition to be used are regulated; a method in which the content of the carboxyl group contained in the carboxyl group-containing highly saturated nitrile rubber (a) is regulated; a method in which the cross-linking conditions (cross-linking time, cross-linking temperature, and the like) are regulated at the time of preparing the cross-linked rubber; a method in which the type and the content of the filler contained in the cross-linked rubber are regulated; and a method in which the type and the content of the additive contained in the cross-linked rubber are regulated.

For example, when the aliphatic polyvalent amines and the aromatic polyvalent amines are used as the polyamine-based cross-linking agent (c), from the viewpoint of setting the time until which the compression stress comes to be 50% of the initial compression stress in the compression stress relaxation test so as to be 300 hours or more, although depending on the cross-linking conditions or the like, it is preferable to regulate the content of the cross-linking agent within a range of preferably 0.2 to 15 parts by weight, and more preferably 0.3 to 12 parts by weight, with respect to 100 parts by mass of the carboxyl group-containing highly saturated nitrile rubber (a).

In addition, from the viewpoint of setting the time until which the compression stress comes to be 50% of the initial compression stress in the compression stress relaxation test so as to be 300 hours or more, it is preferable to regulate the content of the carboxyl group in the carboxyl group-containing highly saturated nitrile rubber (a), namely, the number of moles of the carboxyl group per 100 g of the carboxyl group-containing highly saturated nitrile rubber (a), within a range of preferably $5 \times 10^{-4}$ to $5 \times 10^{-1}$ ephr, more preferably $1 \times 10^{-3}$ to $1 \times 10^{-1}$ ephr, and particularly preferably $5 \times 10^{-3}$ to $5 \times 10^{-2}$ ephr.

Moreover, as the cross-linking conditions at the time of cross-linking the above-mentioned nitrile rubber composition, although depending on the type, content and the like of the polyamine-based cross-linking agent (c) to be used, from the viewpoint of setting the time until which the compression stress comes to be 50% of the initial compression stress in the compression stress relaxation test so as to be 300 hours or more, the cross-linking temperature is preferably 100 to 200° C., and more preferably 130 to 190° C., and the cross-linking time is preferably 1 minute to 24 hours, and more preferably 2 minutes to 1 hour. In addition, when a secondary cross-linking is required due to the shape, the size and the like of the cross-linked rubber, the cross-linking temperature in the secondary cross-linking is preferably 100 to 230° C. and more preferably 130 to 200° C., and the cross-linking time in the secondary cross-linking is preferably 1 minute to 24 hours and more preferably 2 minutes to 1 hour.

The thus obtained cross-linked rubber of the present invention is good in the tensile strength and the elongation at break, and excellent in the sealing property at a low temperature.

Therefore, the cross-linked rubber of the present invention, taking advantage of such a characteristic, can be used for various seal members such as O-rings, packings, diaphragms, oil seals, shaft seals, bearing seals, well head seals, shock absorber seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventer), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator gaskets which are attached between pairs of housings straddling unit cells provided with positive electrodes, electrolyte plates, and negative electrodes, and top cover gaskets for hard disk drives; various types of rolls such as printing rolls, ironmaking rolls, papermaking rolls, industrial rolls, and office equipment rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuit boards or other binders, fuel cell separators and also other broad applications in the electronics field.

In particular, because the cross-linked rubber of the present invention is excellent in the sealing property at a low temperature, specifically, TR70, namely, the temperature (the temperature exhibiting a low temperature elastic recovery rate of 70%) at which 70% shrinkage (recovery) occurs due to temperature increase is preferably −19° C. or lower and more preferably −20° C. or lower, and the cross-linked rubber is particularly excellent in the sealing property at a low temperature, the cross-linked rubber of the present invention can be suitably used in the materials used in low temperature environments, specifically the cross-linked rubber of the present invention can be suitably used as seal members, belts, horses or gaskets used in low temperature environments, and can be particularly suitably used in applications to seal members used in low temperature environments such as shock absorber seals, coolant seals, and oil seals.

EXAMPLES

Hereinafter, the present invention will be described more specifically by way of Examples and Comparative Examples, but the present invention is not limited to these Examples. In what follows, unless otherwise specified, "parts" are based on weight. The physical properties, and the tests and the evaluation methods of the properties are as follows.

Content of Carboxyl Group

To 0.2 g of a 2-mm square piece of a carboxyl group-containing highly saturated nitrile rubber, 100 mL of 2-butanone was added. The mixture was stirred for 16 hours, and then 20 mL of ethanol and 10 mL of water were added to the mixture. While stirring, a titration was performed at roam temperature by using a 0.02N hydrous ethanol solution of potassium hydroxide, and thymolphthalein as an indicator, and thus the content of the carboxyl group was determined as the number of moles of the carboxyl group in 100 g of rubber (units: ephr).

Composition of Carboxyl Group-Containing Highly Saturated Nitrile Rubber

The contents of the respective monomer units constituting the carboxyl group-containing highly saturated nitrile rubber were measured by the following methods.

Specifically, the content of the mono-n-butyl maleate unit was calculated as follows: the number of moles of the carboxyl group with respect to 100 g of the carboxyl group-containing highly saturated nitrile rubber after hydrogenation was determined by the above-mentioned method for measuring "the content of the carboxyl group," and then the determined number of moles was converted into the content of the mono-n-butyl maleate unit.

The content of the 1,3-butadiene unit (including the hydrogenated fraction) was calculated by measuring the iodine value of the carboxyl group-containing nitrile rubber before the hydrogenation reaction by the following method.

The content of the acrylonitrile unit was calculated by measuring the nitrogen content in the carboxyl group-containing highly saturated nitrile rubber after hydrogenation by the Kjeldahl method in accordance with JIS K6384.

The content of the n-butyl acrylate unit and the methoxyethyl acrylate unit was calculated as the balance of the above respective monomer units.

Iodine Value

The iodine value of the carboxyl group-containing highly saturated nitrile rubber was measured in accordance with JIS K 6235.

Original State Physical Properties (Tensile Strength, Elongation at Break, Hardness)

The nitrile rubber composition was placed in a mold of 15 cm in length, 15 cm in width and 0.2 cm in depth, and was press-formed at 170° C. for 20 minutes while being pressurized at a press pressure of 10 MPa. Thus, a sheet-shaped primary cross-linked product was obtained. Then, the obtained primary cross-linked product was transferred to a gear oven and subjected to a secondary cross-linking at 170° C. for 4 hours. The obtained sheet-like cross-linked rubber was punched with a No. 3 type dumbbell to prepare a test piece. By using the obtained test piece, the tensile strength and the elongation at break of the cross-linked rubber were measured in accordance with JIS K6251, and the hardness of the cross-linked rubber was measured in accordance with JIS K6253 by using a durometer hardness tester (type A).

Compression Stress Relaxation Test

The nitrile rubber composition was placed in a mold having an inner diameter of 30 mm and a ring diameter of 3 nm, cross-linked at 170° C. for 20 minutes while being pressed with a press pressure of 10 MPa, and then subjected to a secondary cross-linking at 170° C. for 4 hours, and thus an O-ring shaped cross-linked rubber was obtained. Then, the obtained O-ring shaped cross-linked rubber was made to be in a state of being compressed by 25% in the ring thickness direction in terms of the distance between the two planes sandwiching the O-ring, and a compression stress relaxation test was performed by maintaining the O-ring in an environment at 150° C. After 30 minutes from the start of the test, the compression stress of the O-ring shaped cross-linked rubber was measured, the measured compression stress was taken as the initial compression stress, then the compression stress of the O-ring shaped cross-linked rubber was measured every 100 hours after the start of the test, and the time until which the compression stress came to be 50% of the initial compression stress after 30 minutes from the start of the test was measured.

Note that in the present test, for example, the case where the compression stress exceeded 50% of the initial compression stress after an elapsed time of 100 hours from the start of the test, but after an elapsed time of 200 hours from the start of the test, the compression stress was less than 50% of the initial compression stress was denoted by "100 h<" in Table 1 and Table 2. Similarly, the case where the compression stress exceeded 50% after an elapsed time of 200 hours from the start of the test, but came to be less than 50% after an elapsed time of 300 hours from the start of the test was denoted by "200 h<"; the case where the compression stress exceeded 50% after an elapsed time of 300 hours from the start of the test, but came to be less than 50% after an elapsed time of 400 hours from the start of the test was denoted by "300 h<"; and so on.

Low Temperature Sealing Property (TR70 Under 50% Elongation Condition)

A TR test (low temperature elasticity recovery test) was performed by using the sheet-shaped cross-linked rubber obtained in the same manner as in the case of the evaluation of the original state physical properties, in accordance with JIS K6261, in a state of being elongated by 50%. Specifically, under the conditions that a cross-linked rubber elongated by 50% was frozen, and the temperature of the cross-linked rubber was allowed to be continuously increased, the recovery property of the elongated specimen was measured, and thus, the temperature TR70 at which the length of the cross-linked rubber was shrunk by 70% (recovered) by temperature increase was measured. It is possible to determine that the lower the TR70, the more excellent the low temperature sealing property.

Production Example 1 (Production of Carboxyl Group-Containing Highly Saturated Nitrile Rubber (a1))

In a reactor, 220 parts of ion exchanged water, 5 parts of a sodium dodecylbenzenesulfonate aqueous solution having a concentration of 10%, 20.4 parts of acrylonitrile, 5 parts of mono-n-butyl maleate, 35.2 parts of n-butyl acrylate, 0.35 part of t-dodecylmercaptan (second alkylthiol compound), and 0.03 part of 2,2,4,6,6-pentamethyl-4-heptanethiol (first alkylthiol compound) were placed in the mentioned order, the gas inside the reactor was replaced with nitrogen three times, and then 39.4 parts of 1,3-butadiene was placed in the reactor. Then, the reactor was held at 10° C., 0.1 part of cumene hydroperoxide (polymerization initiator), and suitable amounts of a reducing agent and a chelating agent were placed in the reactor, and the polymerization reaction was continued while the reaction mixture was being stirred; at the times when the polymerization conversion rate reached 90%, 0.1 part of an aqueous solution of hydroquinone (polymerization terminator) having a concentration of 10 wt % was added to terminate the polymerization reaction. Next, the residual monomers were removed at a water temperature of 60° C., to obtain a latex (solid content concentration: 30 wt %) of a nitrile rubber.

Then, in an autoclave, the latex of the nitrile rubber and a palladium catalyst (a solution prepared by mixing a 1 wt % palladium acetate acetone solution and an equal weight of ion exchanged water) were added in such a way that the content of palladium was 2,000 ppm by weight with respect to the dry weight of the rubber contained in the latex of the nitrile rubber obtained as described above; then, a hydrogenation reaction was performed at a hydrogen pressure of 3 MPa and a temperature of 50° C. for 6 hours to obtain a latex of a carboxyl group-containing highly saturated nitrile rubber (a1).

An aqueous solution (coagulant concentration: 25%) of sodium chloride was prepared as a coagulating liquid in a tank, the latex was slowly poured into the tank, subsequently the latex was intensively brought into contact and mixed with the aqueous solution to be coagulated, then the resulting mixture was filtered and the solid product (crumb) was taken out, the solid product was vacuum dried at 60° C. for 12 hours to thereby obtain the carboxyl group-containing highly saturated nitrile rubber (a1). The obtained carboxyl group-containing highly saturated nitrile rubber (a1) had a carboxyl group content of $2.6 \times 10^{-2}$ ephr, and an iodine value of 9. The obtained carboxyl group-containing highly saturated nitrile rubber (a1) included 20.8 wt % of the acrylonitrile unit, 44.2 wt % of the butadiene unit (including the hydrogenated fraction), 5.0 wt % of the mono-n-butyl maleate unit, and 30.0 wt % of the n-butyl acrylate unit.

Production Example 2 (Production of Carboxyl Group-Containing Highly Saturated Nitrile Rubber (a2))

The carboxyl group-containing highly saturated nitrile rubber (a2) was obtained in the same manner as in Production Example 1 except that the content of acrylonitrile was set at 23 parts, the content of mono-n-butyl maleate was set at 6.5 parts, the content of 1,3-butadiene was set at 40 parts, and 30.5 parts of methoxyethyl acrylate was used in place of 35.2 parts of n-butyl acrylate. The obtained carboxyl group-containing highly saturated nitrile rubber (a2) had a carboxyl group content of $3.4 \times 10^{-2}$ ephr, and an iodine value of 9. The obtained carboxyl group-containing highly saturated nitrile rubber (a2) included 24 wt % of the acrylonitrile unit, 46.6 wt % of the butadiene unit (including the hydrogenated fraction), 6.5 wt % of the mono-n-butyl maleate unit, and 22.9 wt % of the methoxyethyl acrylate unit.

Production Example 3 (Production of Carboxyl Group-Containing Highly Saturated Nitrile Rubber (a'3))

The carboxyl group-containing highly saturated nitrile rubber (a'3) was obtained in the same manner as in Production Example 1 except that the content of acrylonitrile was set at 37 parts, the content of mono-n-butyl maleate was set at 4 parts, the content of 1,3-butadiene was set at 57 parts, and 35.2 parts of n-butyl acrylate was not used. The obtained carboxyl group-containing highly saturated nitrile rubber (a'3) had a carboxyl group content of $3.0 \times 10^{-2}$ ephr, and an iodine value of 9. The obtained carboxyl group-containing highly saturated nitrile rubber (a'3) included 35.7 wt % of the acrylonitrile unit, 58.6 wt % of the butadiene unit (including the hydrogenated fraction), and 5.7 wt % of the mono-n-butyl maleate unit.

Production Example 4 (Production of Carboxyl Group-Containing Highly Saturated Nitrile Rubber (a4))

In a reactor, 220 parts of ion exchanged water, 5 parts of a sodium dodecylbenzenesulfonate aqueous solution having a concentration of 10%, 17.2 parts of acrylonitrile, 3.3 parts of mono-n-butyl maleate, 35.2 parts of n-butyl acrylate, and 0.5 part of t-dodecylmercaptan (second alkylthiol compound) were placed in the mentioned order, the gas inside the reactor was replaced with nitrogen three times, and then 26.2 parts of 1,3-butadiene was placed in the reactor. Then, the reactor was held at 10° C., 0.1 part of cumene hydroperoxide (polymerization initiator), and suitable amounts of a reducing agent and a chelating agent were placed in the reactor, and the polymerization reaction was continued while the reaction mixture was being stirred; at the time when the polymerization conversion rate reached 40%, 1.6 part of acrylonitrile, 0.85 part of mono-n-butyl maleate, and 6.6 parts of 1,3-butadiene were added. The polymerization reaction was further continued, and at the time when the polymerization conversion rate reached 70%, 1.6 parts of acrylonitrile, 0.85 part of mono-n-butyl maleate, 6.6 parts of 1,3-butadiene, and 0.15 part of t-dodecylmercaptan were added. The polymerization reaction was further continued, and at the time when the polymerization conversion rate reached 85%, 0.1 part of an aqueous solution of 2,2,6,6-tetramethylpiperidine 1-oxyl (polymerization terminator) having a concentration of 2.5 wt % was added to terminate the polymerization reaction. Next, the residual monomers were removed at a water temperature of 60° C., to obtain a latex (solid content concentration: 30 wt %) of a nitrile rubber.

Then, a hydrogenation reaction was performed for the latex of the nitrile rubber obtained as described above, in the same manner as in Production Example 1, to thereby obtain a latex of the carboxyl group-containing highly saturated nitrile rubber (a4); the latex was subjected to the coagulation, filtration and drying in the same manner as in Production Example 1, and thus the carboxyl group-containing highly saturated nitrile rubber (a4) was obtained. The obtained carboxyl group-containing highly saturated nitrile rubber (a4) had a carboxyl group content of $2.5 \times 10^{-2}$ ephr, and an iodine value of 8. The obtained carboxyl group-containing highly saturated nitrile rubber (a4) included 20.3 wt % of the acrylonitrile unit, 44.5 wt % of the butadiene unit (including the hydrogenated fraction), 4.8 wt % of the mono-n-butyl maleate unit, and 30.4 wt % of the n-butyl acrylate unit.

Production Example 5 (Production of Carboxyl Group-Containing Highly Saturated Nitrile Rubber (a5))

The carboxyl group-containing highly saturated nitrile rubber (a5) was obtained in the same manner as in Production Example 4 except that the amounts of the monomers placed at the start of the polymerization were altered to 15.0 parts of acrylonitrile, 3.0 parts of mono-n-butyl maleate, 35.2 parts of n-butyl acrylate, and 26.0 parts of 1,3-butadiene, the amounts of the monomers added at the time when the polymerization conversion rate reached 40% were altered to 2.6 parts of acrylonitrile, 0.8 part of mono-n-butyl maleate, and 5.0 parts of 1,3-butadiene, and the amounts of the monomers added at the time when the polymerization conversion rate reached 70% were altered to 2.8 parts of acrylonitrile, 1.2 parts of n-butyl maleate, and 8.4 parts of 1,3-butadiene. The obtained carboxyl group-containing highly saturated nitrile rubber (a5) had a carboxyl group content of $2.7 \times 10^{-2}$ ephr, and an iodine value of 10. The obtained carboxyl group-containing highly saturated nitrile rubber (a5) included 21.0 wt % of the acrylonitrile unit, 44.1 wt % of the butadiene unit (including the hydrogenated fraction), 5.2 wt % of the mono-n-butyl maleate unit, and 29.7 wt % of the n-butyl acrylate unit.

Production Example 6 (Production of Carboxyl Group-Containing Highly Saturated Nitrile Rubber (a6))

The carboxyl group-containing highly saturated nitrile rubber (a6) was obtained in the same manner as in Production Example 4 except that the amount of n-butyl acrylate placed at the start of the polymerization was altered to 30.0 parts, 2.6 parts of n-butyl acrylate was added as the monomer added at the time when the polymerization conversion rate reached 40%, and 2.6 parts of n-butyl acrylate was added as the monomer added at the time when the polymerization conversion rate reached 70%. The obtained carboxyl group-containing highly saturated nitrile rubber (a6) had a carboxyl group content of $2.6 \times 10^{-2}$ ephr, and an iodine value of 9. The obtained carboxyl group-containing highly saturated nitrile rubber (a6) included 20.9 wt % of the acrylonitrile unit, 43.8 wt % of the butadiene unit (including the hydrogenated fraction), 5.0 wt % of the mono-n-butyl maleate unit, and 30.3 wt % of the n-butyl acrylate unit.

Production Example 7 (Production of Carboxyl Group-Containing Highly Saturated Nitrile Rubber (a7))

In a metal bottle, 180 parts of ion exchanged water, 25 parts of a sodium dodecylbenzenesulfonate aqueous solution having a concentration of 10 wt %, 13 parts of acrylonitrile, 3 parts of mono-n-butyl maleate, 36 parts of n-butyl acrylate, and 0.5 part of t-dodecylmercaptan (second alkylthiol compound) were placed in the mentioned order, the gas inside the metal bottle was replaced with nitrogen three times, and then 32 parts of 1,3-butadiene was placed in the metal bottle. The metal bottle was held at 10° C., 0.1 part of cumene hydroperoxide (polymerization initiator) was placed in the metal bottle, and the polymerization reaction was continued while the metal bottle was being stirred; at the time when the polymerization conversion rate rotated 40%, 2 part of acrylonitrile, 1 part of mono-n-butyl maleate, and 6 parts of 1,3-butadiene were added. The polymerization reaction was further continued, and at the time when the reaction conversion rate reached 70%, 1 part of acrylonitrile, 1 part of mono-n-butyl maleate, and 5 parts of 1,3-butadiene were added. The polymerization reaction was further continued, at the time when the polymerization conversion rate reached 85%, 0.1 part of an aqueous solution of 2,2,6,6-tetramethylpiperidine 1-oxyl (polymerization terminator) having a concentration of 2.5 wt % was added to terminate the polymerization reaction, and then the residual monomers were removed at a water temperature of 60° C., to obtain a latex (solid content concentration: 30 wt %) of a nitrile rubber.

Then, a hydrogenation reaction was performed for the latex of the nitrile rubber obtained as described above, in the same manner as in Production Example 1 except that the amount of use of the palladium catalyst was set so as to be 1,000 ppm by weight in terms of the palladium content with respect to the dry weight of the rubber contained in the latex of the nitrile rubber, to thereby obtain a latex of the carboxyl group-containing highly saturated nitrile rubber (a7); then the latex was subjected to the coagulation, filtration and drying in the same manner as in Production Example 1, and thus the carboxyl group-containing highly saturated nitrile rubber (a7) was obtained. The obtained carboxyl group-containing highly saturated nitrile rubber (a7) had a carboxyl group content of $2.6 \times 10^{-2}$ ephr, and an iodine value of 10. The obtained carboxyl group-containing highly saturated nitrile rubber (a7) included 15 wt % of the acrylonitrile unit, 45 wt % of the butadiene unit (including the hydrogenated fraction), 5 wt % of the mono-n-butyl maleate unit, and 35 wt % of the n-butyl acrylate unit.

Production Example 8 (Production of Carboxyl Group-Containing Highly Saturated Nitrile Rubber (a8))

The carboxyl group-containing highly saturated nitrile rubber (a8) was obtained in the same manner as in Production Example 7 except that the amounts of the monomers placed at the start of the polymerization were altered to 16.0 parts of acrylonitrile, 5.0 parts of mono-n-butyl maleate, 36.0 parts of n-butyl acrylate, and 43.0 parts of 1,3-butadiene, and no additional addition of the monomers in a stage midway through the reaction was performed. The obtained carboxyl group-containing highly saturated nitrile rubber (a8) had a carboxyl group content of $2.7 \times 10^{-2}$ ephr, and an iodine value of 8. The obtained carboxyl group-containing highly saturated nitrile rubber (a8) included 14.7 wt % of the acrylonitrile unit, 45.2 wt % of the butadiene unit (including the hydrogenated fraction), 5.2 wt % of the mono-n-butyl maleate unit, and 34.9 wt % of the n-butyl acrylate unit.

Production Example 9 (Production of Carboxyl Group-Containing Highly Saturated Nitrile Rubber (a9))

The carboxyl group-containing highly saturated nitrile rubber (a9) was obtained in the same manner as in Production Example 7 except that the amounts of the monomers placed at the start of the polymerization were altered to 10.0 parts of acrylonitrile, 2.0 parts of mono-n-butyl maleate, 36.0 parts of n-butyl acrylate, and 30.0 parts of 1,3-butadiene, the amounts of the monomers added at the time when the polymerization conversion rate reached 40% were altered to 3.0 parts of acrylonitrile, 1.0 part of mono-n-butyl maleate, and 7.0 parts of 1,3-butadiene, and the amounts of the monomers added at the time when the polymerization conversion rate reached 70% were altered to 3.0 parts of acrylonitrile, 2.0 parts of n-butyl maleate, and 6.0 parts of 1,3-butadiene. The obtained carboxyl group-containing highly saturated nitrile rubber (a9) had a carboxyl group content of $2.5 \times 10^{-2}$ ephr, and an iodine value of 9. The obtained carboxyl group-containing highly saturated nitrile rubber (a9) included 15.3 wt % of the acrylonitrile unit, 44.9 wt % of the butadiene unit (including the hydrogenated fraction), 4.8 wt % of the mono-n-butyl maleate unit, and 35.0 wt % of the n-butyl acrylate unit.

Production Example 10 (Production of Carboxyl Group-Containing Highly Saturated Nitrile Rubber (a10))

The carboxyl group-containing highly saturated nitrile rubber (a10) was obtained in the same manner as in Production Example 7 except that the amount of n-butyl acrylate placed at the start of the polymerization was altered to 30.0 parts, 4.0 parts of n-butyl acrylate was supplemented as a monomer added at the time when the polymerization conversion rate reached 40%, and 2.0 parts of n-butyl acrylate was supplemented as a monomer added at the time when the polymerization conversion rate reached 70%. The obtained carboxyl group-containing highly saturated nitrile rubber (a10) had a carboxyl group content of $2.6 \times 10^{-2}$ ephr, and an iodine value of 8. The obtained carboxyl group-containing highly saturated nitrile rubber (a10) included 15.1 wt % of the acrylonitrile unit, 45.4 wt % of the butadiene unit (including the hydrogenated fraction), 5 wt % of the mono-n-butyl maleate unit, and 34.5 wt % of the n-butyl acrylate unit.

Example 1

By using a Banbury mixer, the following ingredients were added to and mixed at 50° C. for 5 minutes with 100 parts of the carboxyl group-containing highly saturated nitrile rubber (a1) obtained in Production Example 1: 90 parts of an aluminum silicate (b1) treated with an amino group-containing silane coupling agent (trade name "Amlok 321," made by Kentucky-Tennessee Clay Company), 5 parts of tri-2-ethylhexyl trimellitate (trade name "Adekacizer C-8," made by ADEKA Corporation, plasticizer), 1.5 parts of 4,4'-di-(α,α-dimethylbenzyl)diphenylamine (trade name "Nocrac CD," made by Ouchi Shinko Chemical Industrial Co., Ltd., antiaging agent), 1 part of stearic acid, and 1 part of a polyoxyethylene alkyl ether phosphoric acid ester (trade name "Phosphanol RL210," made by Toho Chemical Industry Co., Ltd., processing aid). Next, the obtained mixture was transferred to a roll at 50° C., 4 parts of 1,8-diazabicyclo [5.4.0]-undecene-7 (DBU) (trade name "RHENOGRAN XLA-60 (GE2014)", made by Rhein Chemie Corporation; a product composed of 60% of DBU (including a fraction being zinc dialkyldiphosphate salt), a basic cross-linking accelerator), and 1.9 parts of hexamethylenediamine carbamate (trade name "Diak#1", made by Du Pont Dow Elastomer Corporation, polyamine-based cross-linking agent (c) belonging to aliphatic polyvalent amines) were added to the mixture, and the mixture was kneaded to obtain a nitrile rubber composition.

A cross-linked rubber was obtained by using the above-mentioned method and by using the above prepared nitrile rubber composition, and the obtained cross-linked rubber was subjected to the tests/measurements of the original state physical properties (tensile strength, elongation at break, hardness), the compression stress relaxation test, and the low temperature sealing property (TR70 under the 50% elongation condition). The results thus obtained are shown in Table 1.

Example 2

A nitrile rubber composition was obtained in the same manner as in Example 1 except that 90 parts of an aluminum silicate (b2) treated with an amino group-containing silane coupling agent (trade name "Nulok 390," made by KaMin LLIC) was used in place of 90 parts of the aluminum silicate (b1) treated with an amino group-containing silane coupling agent (trade name "Amlok 321"), and the evaluations were performed in the same manner as described above. The results thus obtained are shown in Table 1.

Example 3

A nitrile rubber composition was obtained in the same manner as in Example 1 except that 90 parts of an aluminum silicate (b3) treated with an epoxy group-containing silane coupling agent (trade name "Nulok 170," made by KaMin LLIC) was used in place of 90 parts of the aluminum silicate (b1) treated with an amino group-containing silane coupling agent (trade name "Amlok 321"), and 5 parts of a polyether ester (trade name "Adekacizer RS-700," made by ADEKA Corporation, plasticizer) was used in place of 5 parts of tri-2-ethylhexyl trimellitate (trade name "Adekacizer C-8," made by ADEKA Corporation, plasticizer), and the evaluations were performed in the same manner as described above. The results thus obtained are shown in Table 1.

Example 4

A nitrile rubber composition was obtained in the same manner as in Example 1 except that 90 parts of an aluminum silicate (b4) treated with a mercapto group-containing silane coupling agent (trade name "Mercap 200," made by Kentucky-Tennessee Clay Company) was used in place of 90 parts of the aluminum silicate (b1) treated with an amino group-containing silane coupling agent (trade name "Amlok 321"), and the evaluations were performed in the same manner as described above. The results thus obtained are shown in Table 1.

Example 5

A nitrile rubber composition was obtained in the same manner as in Example 2 except that the content of the aluminum silicate (b2) treated with an amino group-containing silane coupling agent (trade name "Nulok 390") was altered from 90 parts to 30 parts, and 60 parts of an aluminum silicate (b5) treated with a vinyl group-containing silane coupling agent (trade name "Burgess KE," made by Burgess Pigment Company) was further mixed, and the evaluations were performed in the same manner as described above. The results thus obtained are shown in Table 1.

Example 6

A nitrile rubber composition was obtained in the same manner as in Example 1 except that 50 parts of the aluminum silicate (b5) treated with a vinyl group-containing silane coupling agent (trade name "Burgess KE," made by Burgess Pigment Company) was used in place of 90 parts of the aluminum silicate (b1) treated with an amino group-containing silane coupling agent (trade name "Amlok 321"), and 25 parts of silica (trade name "ULTRASIL® VN2," made by Evonik GmbH) was further mixed, and the evaluations were performed in the same manner as described above. The results thus obtained are shown in Table 1.

Example 7

A nitrile rubber composition was obtained in the same manner as in Example 6 except that 1 part of a processing aid (trade name "Struktol ® HT740," made by S&S Japan Co., Ltd.) was further mixed, and the evaluations were performed in the same manner as described above. The results thus obtained are shown in Table 1.

Example 8

A nitrile rubber composition was obtained in the same manner as in Example 1 except that 100 parts of the carboxyl group-containing highly saturated nitrile rubber (a2) obtained in Production Example 2 was used in place of 100 parts of the carboxyl group-containing highly saturated nitrile rubber (a1) obtained in Production Example 1 was used, the content of the aluminum silicate (b1) treated with an amino group-containing silane coupling agent (trade name "Amlok 321") was altered from 90 parts to 85 parts, and the content of hexamethylenediamine carbamate was altered from 1.9 parts to 2.7 parts, and the evaluations were performed in the same manner as described above. The results thus obtained are shown in Table 1.

Example 9

A nitrile rubber composition was obtained in the same manner as in Example 8 except that 85 parts of the aluminum silicate (b2) treated with an amino group-containing silane coupling agent (trade name "Nulok 390") in place of 85 parts of the aluminum silicate (b1) treated with an amino group-containing silane coupling agent (trade name "Amlok 321"), and 5 parts of a polyether ester (trade name "Adekacizer RS-700," made by ADEKA Corporation, plasticizer) was used in place of 5 parts of tri-2-ethylhexyl trimellitate (trade name "Adekacizer C-8," made by ADEKA Corporation, plasticizer), and the evaluations were performed in the same manner as described above. The results thus obtained are shown in Table 1.

Example 10

A nitrile rubber composition was obtained in the same manner as in Example 8 except that 85 parts of the aluminum silicate (b3) treated with an epoxy group-containing silane coupling agent (trade name "Nulok 170") was used in place of 85 parts of the aluminum silicate (b1) treated with an amino group-containing silane coupling agent (trade name "Amlok 321"), and the evaluations were performed in the same manner as described above. The results thus obtained are shown in Table 1.

Example 11

A nitrile rubber composition was obtained in the same manner as in Example 8 except that 85 parts of the aluminum silicate (b4) treated with a mercapto group-containing silane coupling agent (trade name "Mercap 200,") was used in place of 85 parts of the aluminum silicate (b1) treated with an amino group-containing silane coupling agent (trade name "Amlok 321"), and the evaluations were performed in the same manner as described above. The results thus obtained are shown in Table 1.

Example 12

A nitrile rubber composition was obtained in the same manner as in Example 8 except that the content of the aluminum silicate (b2) treated with an amino group-containing silane coupling agent (trade name "Nulok 390") was altered from 85 parts to 30 parts, and 55 parts of the aluminum silicate (b5) treated with a vinyl group-containing silane coupling agent (trade name "Burgess KE") was further mixed, and the evaluations were performed in the same manner as described above. The results thus obtained are shown in Table 1.

Example 13

A nitrile rubber composition was obtained in the same manner as in Example 8 except that 50 parts of the aluminum silicate (b5) treated with a vinyl group-containing silane coupling agent (trade name "Burgess KE," made by Burgess Pigment Company) was used in place of 85 parts of the aluminum silicate (b1) treated with an amino group-containing silane coupling agent (trade name "Amlok 321"), and 25 parts of the silica (trade name "ULTRASIL® VN2," made by Evonik GmbH) was further mixed, and the evaluations were performed in the same manner as described above. The results thus obtained are shown in Table 1.

Example 14

A nitrile rubber composition was obtained in the same manner as in Example 13 except that 1 part of the processing aid (trade name "Struktol ® HT740," made by S&S Japan Co., Ltd.) was further mixed, and the evaluations were performed in the same manner as described above. The results thus obtained are shown in Table 1.

Examples 15 to 20

Nitrile rubber compositions were obtained in the same manner as in Example 1 except that 100 parts of the carboxyl group-containing highly saturated nitrile rubber (a4) obtained in Production Example 4 was used in place of 100 parts of the carboxyl group-containing highly saturated nitrile rubber (a1) obtained in Production Example 1, and the compounding agents shown in Table 2 were mixed in the contents shown in Table 2, and the evaluations were performed in the same manner as described above. The results thus obtained are shown in Table 2.

Examples 21 and 22

Nitrile rubber compositions were obtained in the same manner as in Example 1 except that 100 parts of the carboxyl group-containing highly saturated nitrile rubber (a5) obtained in Production Example 5 was used in place of 100 parts of the carboxyl group-containing highly saturated nitrile rubber (a1) obtained in Production Example 1, and the compounding agents shown in Table 2 were mixed in the contents shown in Table 2, and the evaluations were performed in the same manner as described above. The results thus obtained are shown in Table 2.

Examples 23 and 24

Nitrile rubber compositions were obtained in the same manner as in Example 1 except that 100 parts of the carboxyl group-containing highly saturated nitrile rubber (a6) obtained in Production Example 6 was used in place of 100 parts of the carboxyl group-containing highly saturated nitrile rubber (a1) obtained in Production Example 1, and the compounding agents shown in Table 2 were mixed in the contents shown in Table 2, and the evaluations were performed in the same manner as described above. The results thus obtained are shown in Table 2.

Examples 25 to 31

Nitrile rubber compositions were obtained in the same manner as in Example 1 except that 100 parts of the carboxyl group-containing highly saturated nitrile rubber (a7) obtained in Production Example 7 was used in place of 100 parts of the carboxyl group-containing highly saturated nitrile rubber (a1) obtained in Production Example 1, and the compounding agents shown in Table 3 were mixed in the contents shown in Table 3, and the evaluations were performed in the same manner as described above. The results thus obtained are shown in Table 3.

Examples 32 and 33

Nitrile rubber compositions were obtained in the same manner as in Example 1 except that 100 parts of the carboxyl group-containing highly saturated nitrile rubber (a8) obtained in Production Example 8 was used in place of 100 parts of the carboxyl group-containing highly saturated nitrile rubber (a1) obtained in Production Example 1, and the compounding agents shown in Table 3 were mixed in the contents shown in Table 3, and the evaluations were performed in the same manner as described above. The results thus obtained are shown in Table 3.

Examples 34 and 35

Nitrile rubber compositions were obtained in the same manner as in Example 1 except that 100 parts of the carboxyl group-containing highly saturated nitrile rubber (a9) obtained in Production Example 9 was used in place of 100 parts of the carboxyl group-containing highly saturated nitrile rubber (a1) obtained in Production Example 1, and the compounding agents shown in Table 3 were mixed in the contents shown in Table 3, and the evaluations were performed in the same manner as described above. The results thus obtained are shown in Table 3.

Examples 36 and 37

Nitrile rubber compositions were obtained in the same manner as in Example 1 except that 100 parts of the carboxyl group-containing highly saturated nitrile rubber (a10) obtained in Production Example 10 was used in place of 100 parts of the carboxyl group-containing highly saturated nitrile rubber (a1) obtained in Production Example 1, and the compounding agents shown in Table 3 were mixed in the contents shown in Table 3, and the evaluations were performed in the same manner as described above. The results thus obtained are shown in Table 3.

Comparative Example 1

A nitrile rubber composition was obtained in the same manner as in Example 2 except that the content of hexamethylenediamine carbamate was altered from 1.9 parts to 0.5 part, and the evaluations were performed in the same manner as described above. The results thus obtained are shown in Table 4.

Comparative Example 2

A nitrile rubber composition was obtained in the same manner as in Example 2 except that the content of hexamethylenediamine carbamate was altered from 1.9 parts to 1 part, and the evaluations were performed in the same manner as described above. The results thus obtained are shown in Table 4.

Comparative Example 3

A nitrile rubber composition was obtained in the same manner as in Example 1 except that 90 parts of a surface-untreated aluminum silicate (b'6) (trade name "Satinton #5," made by Engelhard Minerals & Chemicals Corporation) was used in place of 90 parts of the aluminum silicate (b1) treated with an amino group-containing silane coupling agent (trade name "Amlok 321"), and the evaluations were performed in the same manner as described above. The results thus obtained are shown in Table 4.

Comparative Example 4

A nitrile rubber composition was obtained in the same manner as in Example 9 except that the content of hexamethylenediamine carbamate was altered from 2.7 parts to 0.5 part, and 5 parts of tri-2-ethylhexyl trimellitate (trade name "Adekacizer C-8," made by ADEKA Corporation, plasticizer) was used in place of 5 parts of the polyether ester (trade name "Adekacizer RS-700," made by ADEKA Corporation, plasticizer), and the evaluations were performed in the same manner as described above. The results thus obtained are shown in Table 4.

Comparative Example 5

A nitrile rubber composition was obtained in the same manner as in Comparative Example 4 except that the content of hexamethylenediamine carbamate was altered from 0.5 part to 1 part, and the evaluations were performed in the same manner as described above. The results thus obtained are shown in Table 4.

Comparative Example 6

A nitrile rubber composition was obtained in the same manner as in Example 8 except that 85 parts of the surface-untreated aluminum silicate (b'6) (trade name "Satinton #5") was used in place of 85 parts of the aluminum silicate (b1) treated with an amino group-containing silane coupling agent (trade name "Amlok 321"), and the evaluations were performed in the same manner as described above. The results thus obtained are shown in Table 4.

Comparative Examples 7 to 9

Nitrile rubber compositions were obtained in the same manner as in Example 1 except that 100 parts of the carboxyl group-containing highly saturated nitrile rubber (a4) obtained in Production Example 4 was used in place of 100 parts of the carboxyl group-containing highly saturated nitrile rubber (a1) obtained in Production Example 1, and the compounding agents shown in Table 4 were mixed in the contents shown in Table 4, and the evaluations were performed in the same manner as described above. The results thus obtained are shown in Table 4.

Comparative Examples 10 to 15

Nitrile rubber compositions were obtained in the same manner as in Example 1 except that the carboxyl group-containing highly saturated nitrile rubbers (a5) to (a10) obtained respectively in Production Examples 5 to 10, were used each in a content of 100 parts, in place of 100 parts of the carboxyl group-containing highly saturated nitrile rubber (a1) obtained in Production Example 1, and the compounding agents shown in Table 5 were mixed in the contents shown in Table 5, and the evaluations were performed in the same manner as described above. The results thus obtained are shown in Table 5.

Comparative Example 16

A nitrile rubber composition was obtained in the same manner as in Example 2 except that 100 parts of the carboxyl group-containing highly saturated nitrile rubber (a'3) obtained in Production Example 3 was used in place of 100 parts of the carboxyl group-containing highly saturated nitrile rubber (a2) obtained in Production Example 2, the content of the aluminum silicate (b2) treated with an amino group-containing silane coupling agent (trade name "Nulok 390") was altered from 90 parts to 80 parts, and the content of hexamethylenediamine carbamate was altered from 1.9 parts to 0.5 part, and the evaluations were performed in the same manner as described above. The results thus obtained are shown in Table 5.

Comparative Example 17

A nitrile rubber composition was obtained in the same manner as in Comparative Example 16 except that the content of hexamethylenediamine carbamate was altered from 0.5 part to 1 part, and the evaluations were performed in the same manner as described above. The results thus obtained are shown in Table 5.

Comparative Example 18

A nitrile rubber composition was obtained in the same manner as in Comparative Example 16 except that the content of hexamethylenediamine carbamate was altered from 0.5 part to 2.4 parts, and the evaluations were performed in the same manner as described above. The results thus obtained are shown in Table 5.

TABLE 1

| | | | Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| | | | Composition of carboxyl group-containing highly saturated nitrile rubber | | | | | | | | | | | | | |
| Acrylonitrile unit | (wt %) | | 20.8 | 20.8 | 20.8 | 20.8 | 20.8 | 20.8 | 20.8 | 24.0 | 24.0 | 24.0 | 24.0 | 24.0 | 24.0 | 24.0 |
| 1,3-Butadiene unit (including hydrogenated fraction) | (wt %) | | 44.2 | 44.2 | 44.2 | 44.2 | 44.2 | 44.2 | 44.2 | 46.6 | 46.6 | 46.6 | 46.6 | 46.6 | 46.6 | 46.6 |
| Mono-n-butyl maleate unit | (wt %) | | 5.0 | 5.0 | 5.0 | 5.0 | 5.0 | 5.0 | 5.0 | 6.5 | 6.5 | 6.5 | 6.5 | 6.5 | 6.5 | 6.5 |
| n-Butyl acrylate unit | (wt %) | | 30.0 | 30.0 | 30.0 | 30.0 | 30.0 | 30.0 | 30.0 | | | | | | | |
| Methoxyethyl acrylate unit | (wt %) | | | | | | | | | 22.9 | 22.9 | 22.9 | 22.9 | 22.9 | 22.9 | 22.9 |
| | | | Composition of nitrile rubber composition | | | | | | | | | | | | | |
| Carboxyl group-containing highly saturated nitrile rubber (a1) | (parts) | | 100 | | | | | | | | | | | | | |
| Carboxyl group-containing highly saturated nitrile rubber (a2) | (parts) | | | 100 | | | | | | | | | | | | |
| Carboxyl group-containing highly saturated nitrile rubber (a3) | (parts) | | | | 100 | | | | | | | | | | | |
| Carboxyl group-containing highly saturated nitrile rubber (a4) | (parts) | | | | | 100 | | | | | | | | | | |
| Carboxyl group-containing highly saturated nitrile rubber (a5) | (parts) | | | | | | 100 | | | | | | | | | |
| Carboxyl group-containing highly saturated nitrile rubber (a6) | (parts) | | | | | | | 100 | | | | | | | | |
| Carboxyl group-containing highly saturated nitrile rubber (a7) | (parts) | | | | | | | | 100 | | | | | | | |
| Carboxyl group-containing highly saturated nitrile rubber (a8) | (parts) | | | | | | | | | 100 | | | | | | |
| Carboxyl group-containing highly saturated nitrile rubber (a9) | (parts) | | | | | | | | | | 100 | | | | | |
| Carboxyl group-containing highly saturated nitrile rubber (a10) | (parts) | | | | | | | | | | | 100 | 100 | 100 | 100 | 100 |
| Aluminum silicate (b1) treated with amino group-containing silane coupling agent (Amiok 321) | (parts) | | 90 | 90 | | | | | | 85 | | | | | | |
| Aluminum silicate (b2) treated with amino group-containing silane coupling agent (Nulok 390) | (parts) | | | | 90 | | 30 | | | | 85 | | | 30 | | |
| Aluminum silicate (b3) treated with amino group-containing silane coupling agent (Nulok 170) | (parts) | | | | | 90 | | | | | | 85 | | | | |
| Aluminum silicate (b4) treated with amino group-containing silane coupling agent (Mercers 200) | (parts) | | | | | | | | | | | | 85 | | | |
| Aluminum silicate (b5) treated with amino group-containing silane coupling agent (Burgess KE) | (parts) | | | | | | 60 | 50 | 50 | | | | | 55 | 50 | 50 |
| Surface-untreated aluminum silicate (b'6) (Satinton #5) | (parts) | | | | | | | | | | | | | | | |
| Silica (Ultrasil VN2) | (parts) | | | | | | | 25 | 25 | | | | | | 25 | 25 |
| Tri-2-ethylhexyl trimellitate | (parts) | | 5 | 5 | 5 | 5 | 5 | 5 | 5 | 5 | 5 | 5 | 5 | 5 | 5 | 5 |
| Polyether ester | (parts) | | | | | | | | | | 5 | | | | | |
| 4,4'-Di-(α,α-dimethylbenzyl) diphenylamine | (parts) | | 1.5 | 1.5 | 1.5 | 1.5 | 1.5 | 1.5 | 1.5 | 1.5 | 1.5 | 1.5 | 1.5 | 1.5 | 1.5 | 1.5 |
| Stearic acid | (parts) | | 1 | 1 | 1 | 1 | 1 | 1 | 1 | 1 | 1 | 1 | 1 | 1 | 1 | 1 |
| Polyoxyethylene alkyl ether phosphoric acid ester Processing aid (Struktol HT740) | (parts) | | 1 | 1 | 1 | 1 | 1 | 1 | 1 | 1 | 1 | 1 | 1 | 1 | 1 | 1 |
| Hexamethylenediamine carbamate | (parts) | | 1.9 | 1.9 | 1.9 | 1.9 | 1.9 | 1.9 | 1.9 | 2.7 | 2.7 | 2.7 | 2.7 | 2.7 | 2.7 | 2.7 |
| 1,8-Diazabicyclo[5.4.0]-, undecene-7, 60% product | (parts) | | 4 | 4 | 4 | 4 | 4 | 4 | 4 | 4 | 4 | 4 | 4 | 4 | 4 | 4 |
| Tensile strength (MPa) | | | 17.7 | 22.4 | 24.5 | 21.9 | 12.7 | 11.7 | 11.1 | 18.5 | 23.0 | 25.3 | 22.6 | 13.4 | 12.2 | 11.9 |
| Elongation at break (%) | | | 130 | 140 | 190 | 250 | 210 | 270 | 220 | 100 | 100 | 220 | 210 | 260 | 230 | 200 |
| Hardness (Duro A) | | | 69 | 69 | 70 | 69 | 69 | 69 | 69 | 71 | 69 | 70 | 68 | 70 | 73 | 73 |
| Compression stress relaxation test (time at which compression stress comes to be 50%) | | | 500 h< | 500 h< | 400 h< | 300 h< | 500 h< | 400 h< | 400 h< | 500 h< | 500 h< | 400 h< | 300 h< | 500 h< | 400 h< | 400 h< |
| Low temperature sealing property (TR70 under 50% elongation condition) (° C.) | | | −25 | −25 | −24 | −24 | −24 | −21 | −22 | −23 | −23 | −22 | −22 | −22 | −20 | −20 |

TABLE 2

| | | Examples | | | | | | | | | |
|---|---|---|---|---|---|---|---|---|---|---|---|
| | | 15 | 16 | 17 | 18 | 19 | 20 | 21 | 22 | 23 | 24 |
| Composition of carboxyl group-containing highly saturated nitrile rubber | | | | | | | | | | | |
| Acrylonitrile unit | (wt %) | 20.3 | 20.3 | 20.3 | 20.3 | 20.3 | 20.3 | 21.0 | 21.0 | 20.9 | 20.9 |
| 1,3-Butadiene unit (including hydrogenated fraction) | (wt %) | 44.5 | 44.5 | 44.5 | 44.5 | 44.5 | 44.5 | 44.1 | 44.1 | 43.8 | 43.8 |
| Mono-n-butyl maleate unit | (wt %) | 4.8 | 4.8 | 4.8 | 4.8 | 4.8 | 4.8 | 5.2 | 5.2 | 5.0 | 5.0 |
| n-Butyl acrylate unit | (wt %) | 30.4 | 30.4 | 30.4 | 30.4 | 30.4 | 30.4 | 29.7 | 29.7 | 30.3 | 30.3 |
| Methoxyethyl acrylate unit | (wt %) | | | | | | | | | | |
| Composition of nitrile rubber composition | | | | | | | | | | | |
| Carboxyl group-containing highly saturated nitrile rubber (a1) | (parts) | | | | | | | | | | |
| Carboxyl group-containing highly saturated nitrile rubber (a2) | (parts) | | | | | | | | | | |
| Carboxyl group-containing highly saturated nitrile rubber (a'3) | (parts) | | | | | | | | | | |
| Carboxyl group-containing highly saturated nitrile rubber (a4) | (parts) | 100 | 100 | 100 | 100 | 100 | 100 | | | | |
| Carboxyl group-containing highly saturated nitrile rubber (a5) | (parts) | | | | | | | 100 | 100 | | |
| Carboxyl group-containing highly saturated nitrile rubber (a6) | (parts) | | | | | | | | | 100 | 100 |
| Carboxyl group-containing highly saturated nitrile rubber (a7) | (parts) | | | | | | | | | | |
| Carboxyl group-containing highly saturated nitrile rubber (a8) | (parts) | | | | | | | | | | |
| Carboxyl group-containing highly saturated nitrile rubber (a9) | (parts) | | | | | | | | | | |
| Carboxyl group-containing highly saturated nitrile rubber (a10) | (parts) | | | | | | | | | | |
| Aluminum silicate (b1) treated with amino group-containing silane coupling agent (Amiok 321) | (parts) | 90 | | | | | | 90 | | | |
| Aluminum silicate (b2) treated with amino group-containing silane coupling agent (Nulok 390) | (parts) | | 90 | | | 30 | | | | 30 | |
| Aluminum silicate (b3) treated with amino group-containing silane coupling agent (Nulok 170) | (parts) | | | 90 | | | | | | | |
| Aluminum silicate (b4) treated with amino group-containing silane coupling agent (Mercers 200) | (parts) | | | | 90 | | | | | | |
| Aluminum silicate (b5) treated with amino group-containing silane coupling agent (Burgess KE) | (parts) | | | | | 60 | 50 | | 50 | 60 | 50 |
| Surface-untreated aluminum silicate (b'6) (Satinton #5) | (parts) | | | | | | | | | | |
| Silica (Ultrasil VN2) | (parts) | | | | | | 25 | | 25 | | 25 |
| Tri-2-ethylhexyl trimellitate | (parts) | 5 | 5 | 5 | 5 | 5 | | | | | 5 |
| Polyether ester | (parts) | | | | | | 5 | 5 | 5 | 5 | |
| 4,4'-Di-(α,α-dimethylbenzyl)diphenylamine | (parts) | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 |
| Polyoxyethylene alkyl ether phosphoric acid ester | (parts) | 1 | 1 | 1 | 1 | 1 | 1 | 1 | 1 | 1 | 1 |
| Processing aid (Struktol HT740) | (parts) | | | | | | | | | | |
| Hexamethylenediamine carbamate | (parts) | 1.9 | 1.9 | 1.9 | 1.9 | 1.9 | 1.9 | 1.9 | 1.9 | 1.9 | 1.9 |
| 1,8-Diazabicyclo[5.4.0]-undecene-7, 60% product | (parts) | 4 | 4 | 4 | 4 | 4 | 4 | 4 | 4 | 4 | 4 |
| Tensile strength (MPa) | | 17.6 | 22.5 | 24.5 | 22.3 | 12.4 | 12.0 | 18.0 | 11.7 | 12.6 | 11.5 |
| Elongation at break (%) | | 130 | 150 | 190 | 260 | 200 | 270 | 150 | 270 | 210 | 270 |
| Hardness (Duro A) | | 69 | 69 | 70 | 69 | 69 | 68 | 66 | 68 | 68 | 69 |
| Compression stress relaxation test (time at which compression stress comes to be 50%) | | 500 h< | 500 h< | 400 h< | 300 h< | 500 h< | 400 h< | 500 h< | 400 h< | 500 h< | 400 h< |
| Low temperature sealing property (TR70 under 50% elongation condition) (° C.) | | −25 | −25 | −24 | −24 | −24 | −22 | −26 | −21 | −25 | −21 |

TABLE 3

| | | Examples | | | | | | | | | | | | |
|---|---|---|---|---|---|---|---|---|---|---|---|---|---|
| | | 25 | 26 | 27 | 28 | 29 | 30 | 31 | 32 | 33 | 34 | 35 | 36 | 37 |
| Composition of carboxyl group-containing highly saturated nitrile rubber | | | | | | | | | | | | | | |
| Acrylonitrile unit | (wt %) | 15.0 | 15.0 | 15.0 | 15.0 | 15.0 | 15.0 | 15.0 | 14.7 | 14.7 | 15.3 | 15.3 | 15.1 | 15.1 |
| 1,3-Butadiene unit (including hydrogenated fraction) | (wt %) | 45.0 | 45.0 | 45.0 | 45.0 | 45.0 | 45.0 | 45.0 | 45.2 | 45.2 | 44.9 | 44.9 | 45.4 | 45.4 |
| Mono-n-butyl maleate unit | (wt %) | 5.0 | 5.0 | 5.0 | 5.0 | 5.0 | 5.0 | 5.0 | 5.2 | 5.2 | 4.8 | 4.8 | 5.0 | 5.0 |
| n-Butyl acrylate unit | (wt %) | 35.0 | 35.0 | 35.0 | 35.0 | 35.0 | 35.0 | 35.0 | 34.9 | 34.9 | 35.0 | 35.0 | 34.5 | 34.5 |
| Methoxyethyl acrylate unit | (wt %) | | | | | | | | | | | | | |
| Composition of nitrile rubber composition | | | | | | | | | | | | | | |
| Carboxyl group-containing highly saturated nitrile rubber (a1) | (parts) | 100 | | | | | | | | | | | | |
| Carboxyl group-containing highly saturated nitrile rubber (a2) | (parts) | | 100 | | | | | | | | | | | |
| Carboxyl group-containing highly saturated nitrile rubber (a3) | (parts) | | | 100 | | | | | | | | | | |
| Carboxyl group-containing highly saturated nitrile rubber (a4) | (parts) | | | | 100 | | | | | | | | | |
| Carboxyl group-containing highly saturated nitrile rubber (a5) | (parts) | | | | | 100 | | | | | | | | |
| Carboxyl group-containing highly saturated nitrile rubber (a6) | (parts) | | | | | | 100 | | | | | | | |
| Carboxyl group-containing highly saturated nitrile rubber (a7) | (parts) | | | | | | | 100 | | | | | | |
| Carboxyl group-containing highly saturated nitrile rubber (a8) | (parts) | | | | | | | | 100 | 100 | | | | |
| Carboxyl group-containing highly saturated nitrile rubber (a9) | (parts) | | | | | | | | | | 100 | 100 | | |
| Carboxyl group-containing highly saturated nitrile rubber (a10) | (parts) | | | | | | | | | | | | 100 | 100 |
| Aluminum silicate (b1) treated with amino group-containing silane coupling agent (Amiok 321) | (parts) | 90 | | | | | | | | | | | | |
| Aluminum silicate (b2) treated with amino group-containing silane coupling agent (Nulok 390) | (parts) | | 90 | | | 30 | | | 90 | | | | | |
| Aluminum silicate (b3) treated with amino group-containing silane coupling agent (Nulok 170) | (parts) | | | 90 | | | | | | | 90 | | | |
| Aluminum silicate (b4) treated with amino group-containing silane coupling agent (Mercers 200) | (parts) | | | | 90 | | | | | | | | | |
| Aluminum silicate (b5) treated with amino group-containing silane coupling agent (Burgess KE) | (parts) | | | | | 60 | 50 | 50 | | 50 | | 50 | 90 | 50 |
| Surface-untreated aluminum silicate (b'6) (Satinton #5) | (parts) | | | | | | 25 | 25 | | 25 | | 25 | | 25 |
| Silica (Ultrasil VN2) | (parts) | | | | | 5 | | | | 5 | | | | |
| Tri-2-ethylhexyl trimellitate | (parts) | 5 | 5 | 5 | 5 | | 5 | 5 | 5 | 5 | 5 | 5 | 5 | 5 |
| Polyether ester | (parts) | | | | | | | | | | | | | |
| 4,4'-Di-(α,α-dimethylbenzyl) diphenylamine | (parts) | 1.5 | 1.5 | 1.5 | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 | 1 | 1 | 1 |
| Polyoxyethylene alkyl ether phosphoric acid ester Processing aid (Struktol HT740) | (parts) | 1 | 1 | 1 | 1 | 1 | 1 | 1 | 1 | 1 | 1 | 1 | 1 | 1 |
| Hexamethylenediamine carbamate | (parts) | 2.1 | 2.1 | 2.1 | 2.1 | 2.1 | 2.1 | 2.1 | 2.1 | 2.1 | 2.1 | 2.1 | 2.1 | 2.1 |
| 1,8-Diazabicyclo[5.4.0]-undecene-7, 60% product | (parts) | 4 | 4 | 4 | 4 | 4 | 4 | 4 | 4 | 4 | 4 | 4 | 4 | 4 |
| Tensile strength (MPa) | | 15.4 | 20.0 | 22.1 | 19.5 | 10.3 | 9.5 | 9.3 | 20.3 | 9.3 | 22.5 | 9.6 | 19.7 | 9.5 |
| Elongation at break (%) | | 110 | 120 | 170 | 230 | 200 | 250 | 210 | 140 | 230 | 200 | 260 | 250 | 240 |
| Hardness (Duro A) | | 67 | 67 | 69 | 68 | 67 | 68 | 68 | 65 | 68 | 70 | 68 | 68 | 68 |
| Compression stress relaxation test (time at which compression stress comes to be 50%) | | 500 h< | 500 h< | 400 h< | 300 h< | 500 h< | 400 h< | 400 h< | 500 h< | 400 h< | 400 h< | 400 h< | 300 h< | 400 h< |
| Low temperature sealing property (TR70 under 50% elongation condition) (°C) | | −28 | −28 | −27 | −27 | −27 | −26 | −26 | −30 | −25 | −26 | −26 | −29 | −26 |

TABLE 4

| | | Comparative Examples | | | | | | | | |
|---|---|---|---|---|---|---|---|---|---|---|
| | | 1 | 2 | 3 | 4 | 5 | 6 | 7 | 8 | 9 |
| Composition of carboxyl group-containing highly saturated nitrile rubber | | | | | | | | | | |
| Acrylonitrile unit | (wt %) | 20.8 | 20.8 | 20.8 | 24.0 | 24.0 | 24.0 | 20.3 | 20.3 | 20.3 |
| 1,3-Butadiene unit (including hydrogenated fraction) | (wt %) | 44.2 | 44.2 | 44.2 | 46.6 | 46.6 | 46.6 | 44.5 | 44.5 | 44.5 |
| Mono-n-butyl maleate unit | (wt %) | 5.0 | 5.0 | 5.0 | 6.5 | 6.5 | 6.5 | 4.8 | 4.8 | 4.8 |
| n-Butyl acrylate unit | (wt %) | 30.0 | 30.0 | 30.0 | | | | 30.4 | 30.4 | 30.4 |
| Methoxyethyl acrylate unit | (wt %) | | | | 22.9 | 22.9 | 22.9 | | | |
| Composition of nitrile rubber composition | | | | | | | | | | |
| Carboxyl group-containing highly saturated nitrile rubber (a1) | (parts) | 100 | 100 | 100 | | | | | | |
| Carboxyl group-containing highly saturated nitrile rubber (a2) | (parts) | | | | 100 | 100 | 100 | | | |
| Carboxyl group-containing highly saturated nitrile rubber (a'3) | (parts) | | | | | | | 100 | 100 | 100 |
| Carboxyl group-containing highly saturated nitrile rubber (a4) | (parts) | | | | | | | | | |
| Carboxyl group-containing highly saturated nitrile rubber (a5) | (parts) | | | | | | | | | |
| Carboxyl group-containing highly saturated nitrile rubber (a6) | (parts) | | | | | | | | | |
| Carboxyl group-containing highly saturated nitrile rubber (a7) | (parts) | | | | | | | | | |
| Carboxyl group-containing highly saturated nitrile rubber (a8) | (parts) | | | | | | | | | |
| Carboxyl group-containing highly saturated nitrile rubber (a9) | (parts) | | | | | | | | | |
| Carboxyl group-containing highly saturated nitrile rubber (a10) | (parts) | | | | | | | | | |
| Aluminum silicate (b1) treated with amino group-containing silane coupling agent (Amiok 321) | (parts) | | | | | | | | | |
| Aluminum silicate (b2) treated with amino group-containing silane coupling agent (Nulok 390) | (parts) | 90 | 90 | | 85 | 85 | | 90 | 90 | |
| Aluminum silicate (b3) treated with amino group-containing silane coupling agent (Nulok 170) | (parts) | | | | | | | | | |
| Aluminum silicate (b4) treated with amino group-containing silane coupling agent (Mercers 200) | (parts) | | | | | | | | | |
| Aluminum silicate (b5) treated with amino group-containing silane coupling agent (Burgess KE) | (parts) | | | | | | | | | |
| Surface-untreated aluminum silicate (b'6) (Satinton #5) | (parts) | | | 90 | | | 85 | | | 90 |
| Silica (Ultrasil VN2) | (parts) | | | | | | | | | |
| Tri-2-ethylhexyl trimellitate | (parts) | 5 | 5 | 5 | 5 | 5 | 5 | 5 | 5 | 5 |
| Polyether ester | (parts) | | | | | | | | | |
| 4,4'-Di-(α,α-dimethylbenzyl) diphenylamine | (parts) | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 |
| Polyoxyethylene alkyl ether phosphoric acid ester | (parts) | 1 | 1 | 1 | 1 | 1 | 1 | 1 | 1 | 1 |
| Processing aid (Struktol HT740) | (parts) | | | | | | | | | |
| Hexamethylenediamine carbamate | (parts) | 0.5 | 1 | 1.9 | 0.5 | 1 | 2.7 | 0.5 | 1 | 1.9 |
| 1,8-Diazabicyclo[5.4.0]-undecene-7, 60% product | (parts) | 4 | 4 | 4 | 4 | 4 | 4 | 4 | 4 | 4 |
| Tensile strength (MPa) | | 15.8 | 16.7 | 11.6 | 21.1 | 22.5 | 12.4 | 15.9 | 16.9 | 11.5 |
| Elongation at break (%) | | 350 | 200 | 230 | 320 | 170 | 250 | 350 | 210 | 230 |
| Hardness (Duro A) | | 64 | 68 | 68 | 65 | 69 | 69 | 64 | 68 | 68 |
| Compression stress relaxation test (time at which compression stress comes to be 50%) | | 100 h< | 200 h< | 200 h< | 100 h< | 200 h< | 200 h< | 100 h< | 200 h< | 200 h< |
| Low temperature sealing property (TR70 under 50% elongation condition) (° C.) | | −8 | −15 | −22 | −7 | −12 | −20 | −8 | −15 | −22 |

|  |  | Comparative Example | | | | | | | | |
|---|---|---|---|---|---|---|---|---|---|---|
|  |  | 10 | 11 | 12 | 13 | 14 | 15 | 16 | 17 | 18 |
| Composition of carboxyl group-containing highly saturated nitrile rubber | | | | | | | | | | |
| Acrylonitrile unit | (wt %) | 21.0 | 20.9 | 15.0 | 14.7 | 15.3 | 15.1 | 35.7 | 35.7 | 35.7 |
| 1,3-Butadiene unit (including hydrogenated fraction) | (wt %) | 44.1 | 43.8 | 45.0 | 45.2 | 44.9 | 45.4 | 58.6 | 58.6 | 58.6 |
| Mono-n-butyl maleate unit | (wt %) | 5.2 | 5.0 | 5.0 | 5.2 | 4.8 | 5.0 | 5.7 | 5.7 | 5.7 |
| n-Butyl acrylate unit | (wt %) | 29.7 | 30.3 | 35.0 | 34.9 | 35.0 | 34.5 |  |  |  |
| Methoxyethyl acrylate unit | (wt %) |  |  |  |  |  |  |  |  |  |
| Composition of nitrile rubber composition | | | | | | | | | | |
| Carboxyl group-containing highly saturated nitrile rubber (a1) | (parts) |  |  |  |  |  |  |  |  |  |
| Carboxyl group-containing highly saturated nitrile rubber (a2) | (parts) |  |  |  |  |  |  |  |  |  |
| Carboxyl group-containing highly saturated nitrile rubber (a'3) | (parts) |  |  |  |  |  |  | 100 | 100 | 100 |
| Carboxyl group-containing highly saturated nitrile rubber (a4) | (parts) |  |  |  |  |  |  |  |  |  |
| Carboxyl group-containing highly saturated nitrile rubber (a5) | (parts) | 100 |  |  |  |  |  |  |  |  |
| Carboxyl group-containing highly saturated nitrile rubber (a6) | (parts) |  | 100 |  |  |  |  |  |  |  |
| Carboxyl group-containing highly saturated nitrile rubber (a7) | (parts) |  |  | 100 |  |  |  |  |  |  |
| Carboxyl group-containing highly saturated nitrile rubber (a8) | (parts) |  |  |  | 100 |  |  |  |  |  |
| Carboxyl group-containing highly saturated nitrile rubber (a9) | (parts) |  |  |  |  | 100 |  |  |  |  |
| Carboxyl group-containing highly saturated nitrile rubber (a10) | (parts) |  |  |  |  |  | 100 |  |  |  |
| Aluminum silicate (b1) treated with amino group-containing silane coupling agent (Amiok 321) | (parts) |  |  |  |  |  |  |  |  |  |
| Aluminum silicate (b2) treated with amino group-containing silane coupling agent (Nulok 390) | (parts) |  |  |  |  |  |  | 80 | 80 | 80 |
| Aluminum silicate (b3) treated with amino group-containing silane coupling agent (Nulok 170) | (parts) |  |  |  |  |  |  |  |  |  |
| Aluminum silicate (b4) treated with amino group-containing silane coupling agent (Mercers 200) | (parts) |  |  |  |  |  |  |  |  |  |
| Aluminum silicate (b5) treated with amino group-containing silane coupling agent (Burgess KE) | (parts) |  |  |  |  |  |  |  |  |  |
| Surface-untreated aluminum silicate (b'6) (Satinton #5) | (parts) | 90 | 90 | 90 | 90 | 90 | 90 |  |  |  |
| Silica (Ultrasil VN2) | (parts) |  |  |  |  |  |  |  |  |  |
| Tri-2-ethylhexyl trimellitate | (parts) |  | 5 | 5 |  | 5 |  | 5 | 5 | 5 |
| Polyether ester | (parts) | 5 |  |  | 5 |  | 5 |  |  |  |
| 4,4'-Di-(α,α-dimethylbenzyl) diphenylamine | (parts) | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 |
| Polyoxyethylene alkyl ether phosphoric acid ester | (parts) | 1 | 1 | 1 | 1 | 1 | 1 | 1 | 1 | 1 |
| Processing aid (Struktol HT740) | (parts) |  |  |  |  |  |  |  |  |  |
| Hexamethylenediamine carbamate | (parts) | 1.9 | 1.9 | 2.1 | 2.1 | 2.1 | 2.1 | 0.5 | 1 | 2.4 |
| 1,8-Diazabicyclo[5.4.0]-undecene-7, 60% product | (parts) | 4 | 4 | 4 | 4 | 4 | 4 | 4 | 4 | 4 |
| Tensile strength (MPa) |  | 11.9 | 11.5 | 10.3 | 10.5 | 10.3 | 10.5 | 22.5 | 24.0 | 26.5 |
| Elongation at break (%) |  | 250 | 230 | 220 | 230 | 220 | 230 | 290 | 330 | 150 |
| Hardness (Duro A) |  | 66 | 68 | 67 | 66 | 67 | 68 | 69 | 74 | 75 |
| Compression stress relaxation test (time at which compression stress comes to be 50%) |  | 200 h< | 200 h< | 200 h< | 200 h< | 200 h< | 200 h< | 100 h< | 200 h< | 200 h< |
| Low temperature sealing property (TR70 under 50% elongation condition) (° C.) |  | −24 | −22 | −25 | −26 | −25 | −26 | −6 | −10 | −18 |

As shown in Tables 1 to 5, in any of the cross-linked rubbers obtained by cross-linking the nitrile rubber compositions comprising the carboxyl group-containing highly saturated nitrile rubber (a) specified by the present invention, the surface treated silicate (b), and a predetermined amount of the polyamine-based cross-linking agent (c), and having a time of 300 hours or more as the time until which the compression stress in the compression stress relaxation test under the conditions of 150° C. and 25% compression came to be 50% of the initial compression stress, the tensile strength was as high as 9 MPa or more and the elongation at break was as high as 100% or more, additionally TR70 under the 50% elongation condition was −20° C. or lower, and the low temperature sealing property was excellent (Examples 1 to 37).

Even in any of the cross-linked rubbers obtained by cross-linking the nitrile rubber compositions comprising the carboxyl group-containing highly saturated nitrile rubber (a) specified by the present invention, the surface treated silicate (b), and a predetermined amount of the polyamine-based cross-linking agent (c), in any case having a time of less than 300 hours as the time until which the compression stress in the compression stress relaxation test under the conditions of 150° C. and 25% compression came to be 50% of the initial compression stress, TR70 under the 50% elongation condition exceeded −20° C., and the low temperature sealing property was poor (Comparative Examples 1, 2, 4, 5, 7 and 8).

In any of the cases where the surface untreated aluminum silicate was used in place of the surface treated silicate (b), the tensile strength of the obtained cross-linked rubber decreases (Comparative Examples 3, 6, and 9 to 15).

Moreover, in any of the cases where a rubber containing no α,β-ethylenically unsaturated monocarboxylic acid ester monomer unit was used in place of the carboxyl group-containing highly saturated nitrile rubber (a) specified by the present invention, TR70 under the 50% elongation condition exceeded −20° C., and the low temperature sealing property was poor (Comparative Examples 16 to 18).

The invention claimed is:

1. A cross-linked rubber prepared by cross-linking a nitrile rubber composition, the nitrile rubber composition comprising: a carboxyl group-containing highly saturated nitrile rubber (a) containing 5 to 60 wt % of an α,β-ethylenically unsaturated nitrile monomer unit, and an α,β-ethylenically unsaturated monocarboxylic acid ester monomer unit, and having an iodine value of 120 or less; a surface treated silicate (b); and a polyamine-based cross-linking agent (c), wherein a content of the polyamine-based cross-linking agent (c) is 0.1 to 20 parts by weight with respect to 100 parts by weight of the carboxyl group-containing highly saturated nitrile rubber (a), wherein when the cross-linked rubber is subjected to a compression stress relaxation test in which the cross-linked rubber is maintained at 150° C. in a state of being compressed by 25%, the time until which the compression stress comes to be 50% of the initial compression stress at the start of the compression stress relaxation test, the compression stress after 30 minutes from the start of the compression stress relaxation test, is 300 hours or more.

2. The cross-linked rubber according to claim 1, wherein the surface treated silicate (b) is prepared by surface treating a silicate with an amino group-containing silane coupling agent or an epoxy group-containing silane coupling agent.

3. The cross-linked rubber according to claim 1, wherein the surface treated silicate (b) is prepared by surface treating a silicate with an amino group-containing silane coupling agent.

4. The cross-linked rubber according to claim 1, wherein the nitrile rubber composition further contains a basic cross-linking accelerator (d).

5. The cross-linked rubber according to claim 1, wherein the carboxyl group-containing highly saturated nitrile rubber (a) comprises 5 to 60 wt % of an α,β-ethylenically unsaturated nitrile monomer unit, 10 to 55 wt % of an α,β-ethylenically unsaturated monocarboxylic acid ester monomer unit, and 0.1 to 20 wt % of a carboxyl group-containing monomer unit.

6. The cross-linked rubber according to claim 5, wherein the carboxyl group-containing monomer unit is an α,β-ethylenically unsaturated dicarboxylic acid monoester monomer unit.

7. The cross-linked rubber according to claim 1, wherein the surface treated silicate (b) is prepared by surface treating, with a surface treating agent, a silicate of an element of Group 2 or Group 13 of the periodic table.

8. The cross-linked rubber according to claim 7, wherein the surface treated silicate(b) is prepared by surface treating, with the surface treating agent, a compound represented by the following general formula (1

$$MO \cdot xSiO_2 \cdot mH_2O \quad (1)$$

wherein M represents an element of Group 2 or Group 13 of the periodic table, x is a positive real number of 8 or less, and m is 0 or a positive real number of 12 or less.

9. A seal member prepared from the cross-linked rubber according to claim 1.

10. The cross-linked rubber according to claim 1, wherein the content of the polyamine-based cross-linking agent (c) is 0.1 to 2.1 parts by weight with respect to 100 parts by weight of the carboxyl group-containing highly saturated nitrile rubber (a).

* * * * *